(12) United States Patent
Reid et al.

(10) Patent No.: US 10,164,879 B2
(45) Date of Patent: Dec. 25, 2018

(54) METHOD FOR PERFORMING OPTIMIZED FLOW SWITCHING

(71) Applicant: EMBRIONIX DESIGN INC, Laval (CA)

(72) Inventors: Yanik Reid, Terrebonne (CA); Normand Leclerc, St-Jean-sur-le-Richelieu (CA); Louis Caron, Mascouche (CA); Renaud Lavoie, Laval (CA); Eric Dudemaine, Crabtree (CA)

(73) Assignee: Embrionix Design Inc., Laval (CA)

( * ) Notice: Subject to any disclaimer, the term of this patent is extended or adjusted under 35 U.S.C. 154(b) by 57 days.

(21) Appl. No.: 15/348,154

(22) Filed: Nov. 10, 2016

(65) Prior Publication Data

US 2018/0131607 A1    May 10, 2018

(51) Int. Cl.
| | | |
|---|---|---|
| *H04L 12/28* | (2006.01) | |
| *H04L 12/721* | (2013.01) | |
| *G06F 13/40* | (2006.01) | |
| *H04L 12/18* | (2006.01) | |
| *H04L 12/46* | (2006.01) | |
| *H04L 12/741* | (2013.01) | |
| *H04L 12/891* | (2013.01) | |
| *H04L 12/933* | (2013.01) | |

(52) U.S. Cl.
CPC .......... *H04L 45/72* (2013.01); *G06F 13/4022* (2013.01); *G06F 13/4081* (2013.01); *H04L 12/185* (2013.01); *H04L 12/1895* (2013.01); *H04L 12/4666* (2013.01); *H04L 45/745* (2013.01); *H04L 47/41* (2013.01); *H04L 49/109* (2013.01)

(58) Field of Classification Search
CPC ... H04L 45/72; H04L 12/185; H04L 12/4666; H04L 45/745; H04L 47/41; H04L 49/109; G06F 13/4022; G06F 13/4081
See application file for complete search history.

(56) References Cited

U.S. PATENT DOCUMENTS

| | | | |
|---|---|---|---|
| 7,697,566 B2 * | 4/2010 | Keane | H04L 12/413 370/466 |
| 7,808,891 B2 | 10/2010 | Law | |
| 7,940,644 B2 | 5/2011 | Oran et al. | |
| 2008/0267078 A1 | 10/2008 | Farinacci et al. | |
| 2011/0135316 A1 * | 6/2011 | Fankhauser | G02B 6/4453 398/164 |

(Continued)

*Primary Examiner* — Abdelnabi O Musa
(74) *Attorney, Agent, or Firm* — IP Delta Plus Inc.

(57) ABSTRACT

First and second IP flows corresponding to a first source are received. An SDI signal corresponding to the first source is generated based on a selected one of the simultaneously received first and second flows. Reception of one of the first and second flows is stopped, and the SDI signal is generated based on the remaining one of the first and second flows. A third IP flow transporting a payload corresponding to a second source is received, and a transition performed between first and second sources. An SDI signal corresponding to the second source is generated based on the third flow. Reception of the remaining one of the first and second flows is stopped, and a fourth IP flow corresponding to the second source is received. The SDI signal corresponding to the second source is generated based on a selected one of the simultaneously received third and fourth flows.

20 Claims, 20 Drawing Sheets

(56) References Cited

U.S. PATENT DOCUMENTS

2012/0257103 A1* 10/2012 Lavoie .................... H04N 7/01
                                                                   348/441
2016/0080274 A1* 3/2016 Meyer .................... H04L 47/18
                                                                   370/231

* cited by examiner

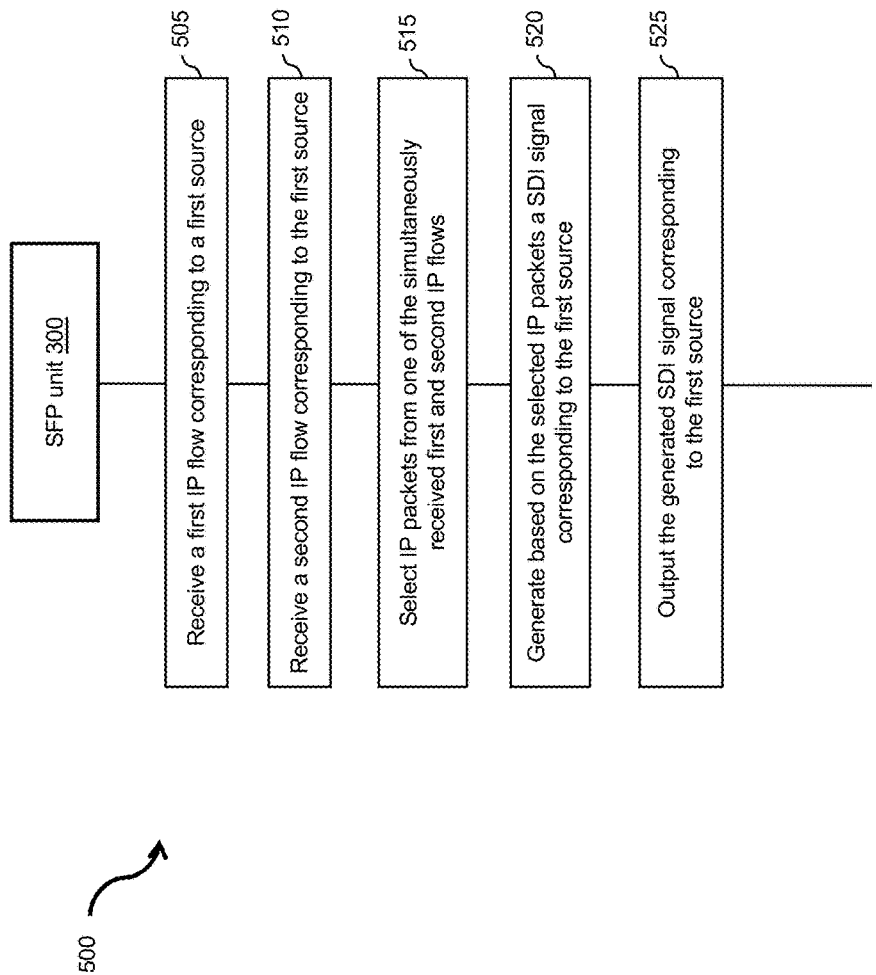

METHOD FOR PERFORMING OPTIMIZED FLOW SWITCHING

TECHNICAL FIELD

The present disclosure relates to the field of standardized hot-pluggable transceiving units. More specifically, the present disclosure relates to a method implemented by a standardized hot-pluggable transceiving unit for performing optimized flow switching.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at the SFF Committee website.

SFP units may be used with various types of exterior connectors, such as coaxial connectors, optical connectors, RJ45 connectors and various other types of electrical connectors. In general, an SFP unit allows connection between an external apparatus (via a front connector of the SFP unit having one of the aforementioned types) and internal components of a hosting unit (via a back interface of the SFP unit). Examples of the internal components of the hosting unit include a motherboard, a card or a backplane leading to further components, etc. Specification no INF-8074i Rev 1.0, entitled "SFP (Small Form-factor Pluggable) Transceiver, dated May 12, 2001, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, signal monitoring, etc.

In the field of video transport, advances have been made recently for transporting the payload of a video signal into Internet Protocol (IP) packets (e.g. Serial Digital Interface (SDI) video payloads encapsulated into IP packets). Furthermore, SFP units have been adapted to provide the following functionalities: a first SFP unit transforms an SDI signal transporting a video payload into an IP flow, the IP flow is transported over an IP networking infrastructure, and a second SFP unit transforms the IP flow back into an SDI signal transporting the video payload.

There are several issues with the transport of video payloads on an IP networking infrastructure. One issue is that an IP packet transporting a video payload may be delayed, or even lost. Since video is a time sensitive application, and in some cases a high level of image quality may be a requirement, issues related to packet delay and packet loss need to be addressed.

One way to address the issue of packet delay and packet loss is to generate two duplicate IP flows for transporting the same video payload. The two duplicate IP flows use two separate IP paths in the IP networking infrastructure. A receiver receives the two separate IP flows and uses the packets of the "best" IP flow to extract the video payload. The "best" IP flow is determined based on one or more metrics determined for each of the duplicate IP flows, such as packet delay, packet loss rate, etc. However, using two duplicate IP flows doubles the bandwidth used for transporting the video payload on the IP networking infrastructure.

At the receiver level, flow switching is generally implemented for switching from a first IP flow corresponding to a first video source to a second IP flow corresponding to a second video source. A Join Before Leave" approach is generally used, where the first and second IP flows are received simultaneously for a short period of time, in order to perform a smooth transition between the first and second video sources. Before the transition, only the first video IP flow is received; and after the transition, only the second video IP flow is received.

Combining the "Join Before Leave" approach and the use of duplicate IP flows, during the short period of time for performing the smooth transition, four IP flows are simultaneously transported over the IP networking infrastructure. A single video payload is extracted by the receiver based on the four IP flows. The extracted video payload is for example outputted by the receiver in the form of an SDI signal transporting the extracted video payload. The four simultaneous IP flows consist of two duplicate IP flows corresponding to the first video source, and two duplicate IP flows corresponding to the second video source. The burden on the IP network infrastructure is heavy, since each IP flow transporting a video payload requires an important amount of bandwidth, typically in the order of several Gigabits per second.

Another approach to flow switching having a lower impact on the IP networking infrastructure consists in a "Leave Before Join" approach. In this approach, the last frame of the first video source is frozen, so that the receiver can leave the first IP flow first, and then join the second IP flow. Although this approach may be acceptable in certain use cases, it does not provide a seamless flow switching, Therefore, there is a need for a new method implemented by a standardized hot-pluggable transceiving unit for performing optimized flow switching.

SUMMARY

According to a first aspect, the present disclosure provides a method implemented by a standardized hot-pluggable transceiving unit for performing optimized flow switching. The method comprises receiving, via a rear connector of a standardized hot-pluggable transceiving unit, a first Internet Protocol (IP) flow transporting a payload corresponding to a first source. The method comprises receiving, via the rear connector, a second IP flow transporting a payload corresponding to the first source. The method comprises selecting, by a processing unit of the transceiving unit, IP packets from one of the simultaneously received first and second IP flows, and generating based on the selected IP packets a Serial Digital Interface (SDI) signal comprising a payload corresponding to the first source. The method comprises stopping the reception of one of the first and second IP flows to only receive a remaining one of the first and second IP flows via the rear connector, and generating the SDI signal comprising a payload corresponding to the first source based on the IP packets of the remaining one of the first and second IP flows. The method comprises receiving, via the rear connector, a third IP flow transporting a payload corresponding to a second source. The method comprises performing, by the processing unit, a transition between the first source and the second source. The method comprises generating, by the processing unit, an SDI signal comprising a payload corresponding to the second source based on the IP packets of the third IP flow. The method comprises stopping the reception of the remaining one of the first and second IP flows via the rear connector. The method comprises receiving, via the rear connector, a fourth IP flow transporting a payload corresponding to the second source. The method comprises selecting, by the processing unit, IP packets from one of the simultaneously received third and fourth IP flows, and generating based on the selected IP packets the SDI signal comprising a payload corresponding to the second source. The SDI signal comprising a payload corresponding to the first source and the SDI signal comprising a payload corresponding to the second source are outputted via a front connector of the transceiving unit.

According to a second aspect, the present disclosure provides a non-transitory computer program product comprising instructions deliverable via an electronically-readable media such as storage media and communication links. The instructions when executed by a processing unit of a computing device provide for performing optimized flow switching. The instructions provide for receiving a first IP flow transporting a payload corresponding to a first source. The instructions provide for receiving a second IP flow transporting a payload corresponding to the first source. The instructions provide for selecting IP packets from one of the simultaneously received first and second IP flows, and generating based on the selected IP packets an SDI signal comprising a payload corresponding to the first source. The instructions provide for stopping the reception of one of the first and second IP flows to only receive a remaining one of the first and second IP flows, and generating the SDI signal comprising a payload corresponding to the first source based on the IP packets of the remaining one of the first and second IP flows. The instructions provide for receiving a third IP flow transporting a payload corresponding to a second source. The instructions provide for performing a transition between the first source and the second source. The instructions provide for generating an SDI signal comprising a payload corresponding to the second source based on the IP packets of the third IP flow. The instructions provide for stopping the reception of the remaining one of the first and second IP flows. The instructions provide for receiving a fourth IP flow transporting a payload corresponding to the second source. The instructions provide for selecting IP packets from one of the simultaneously received third and fourth IP flows, and generating based on the selected IP packets the SDI signal comprising a payload corresponding to the second source. The SDI signal comprising a payload corresponding to the first source and the SDI signal comprising a payload corresponding to the second source are outputted from the computing device.

According to a third aspect, the present disclosure provides a system comprising a chassis adapted for receiving at least one standardized hot-pluggable transceiving unit. The system also comprises a standardized hot-pluggable transceiving unit inserted into the chassis and implementing the aforementioned method for performing optimized flow switching.

BRIEF DESCRIPTION OF THE DRAWINGS

Embodiments of the disclosure will be described by way of example only with reference to the accompanying drawings, in which:

FIGS. 12A-D represent the steps of the method for performing optimized flow switching.

DETAILED DESCRIPTION

Figure 1:
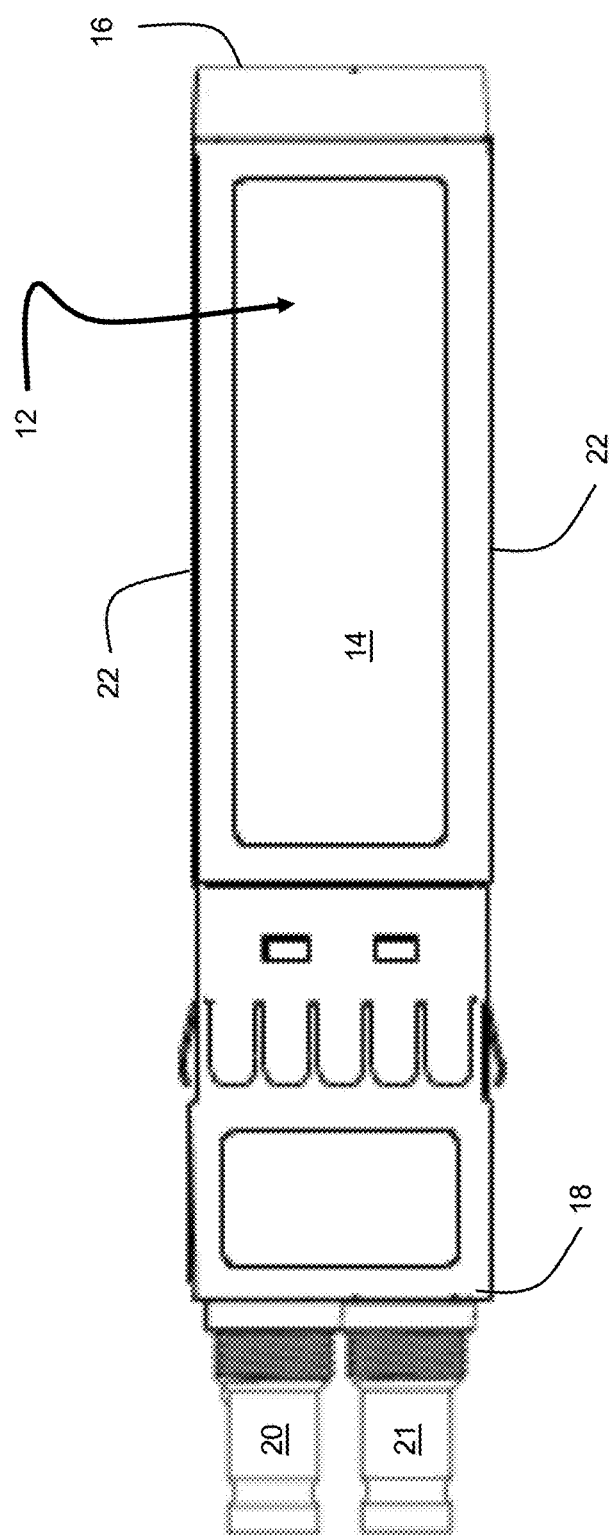
FIG. 1 is a top view of an SFP unit.
Figure 2:
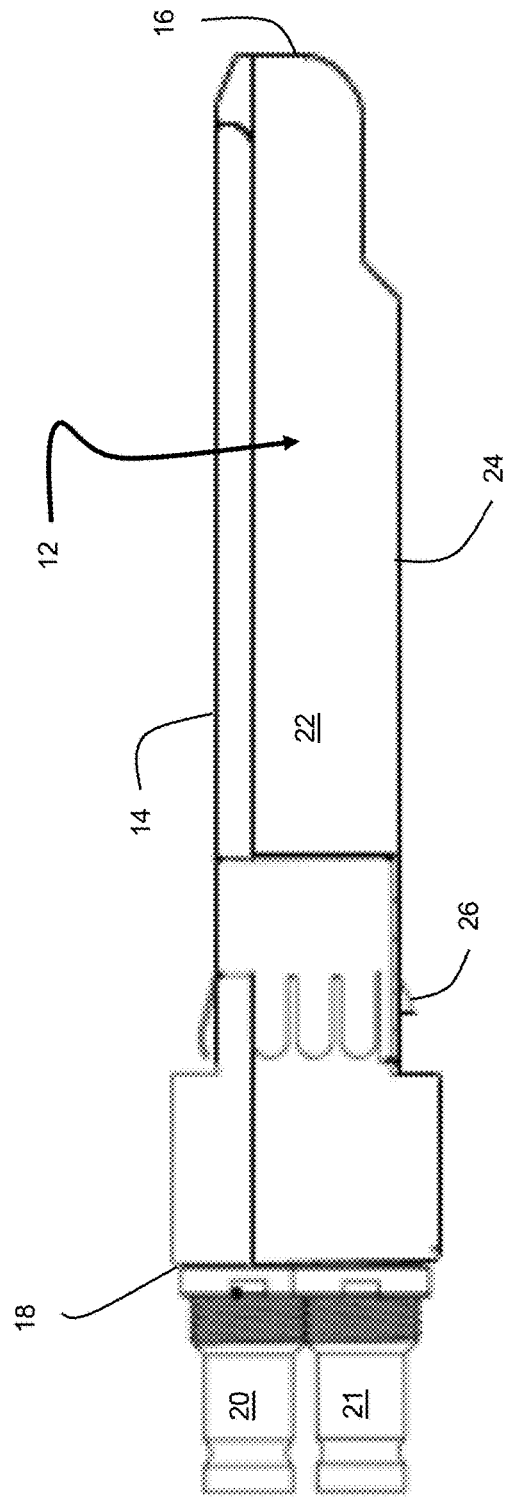
FIG. 2 is a side elevation view of the SFP unit of FIG. 1.
Figure 4:
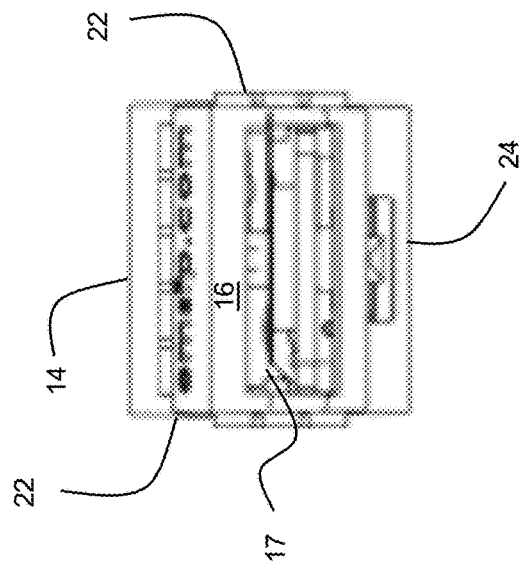
FIG. 4 is back elevation view of the SFP unit of FIG. 1.
Figure 3:
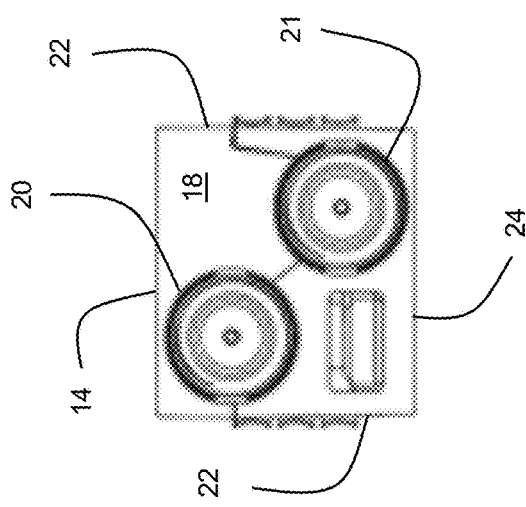
FIG. 3 is a front elevation view of the SFP unit of FIG. 1.
Figure 5:
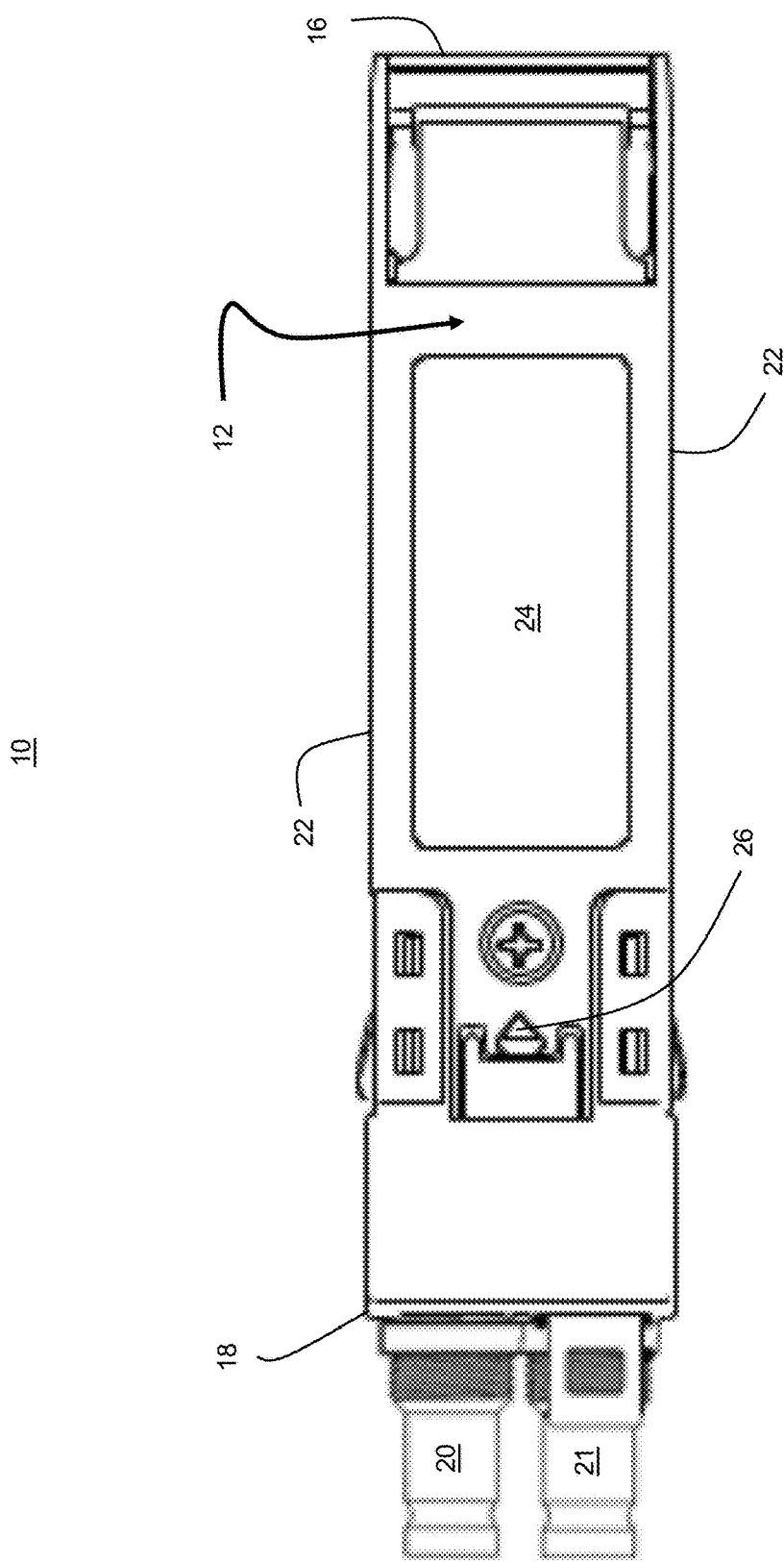
FIG. 5 is a bottom view of the SFP unit of FIG. 1.
Figure 6:
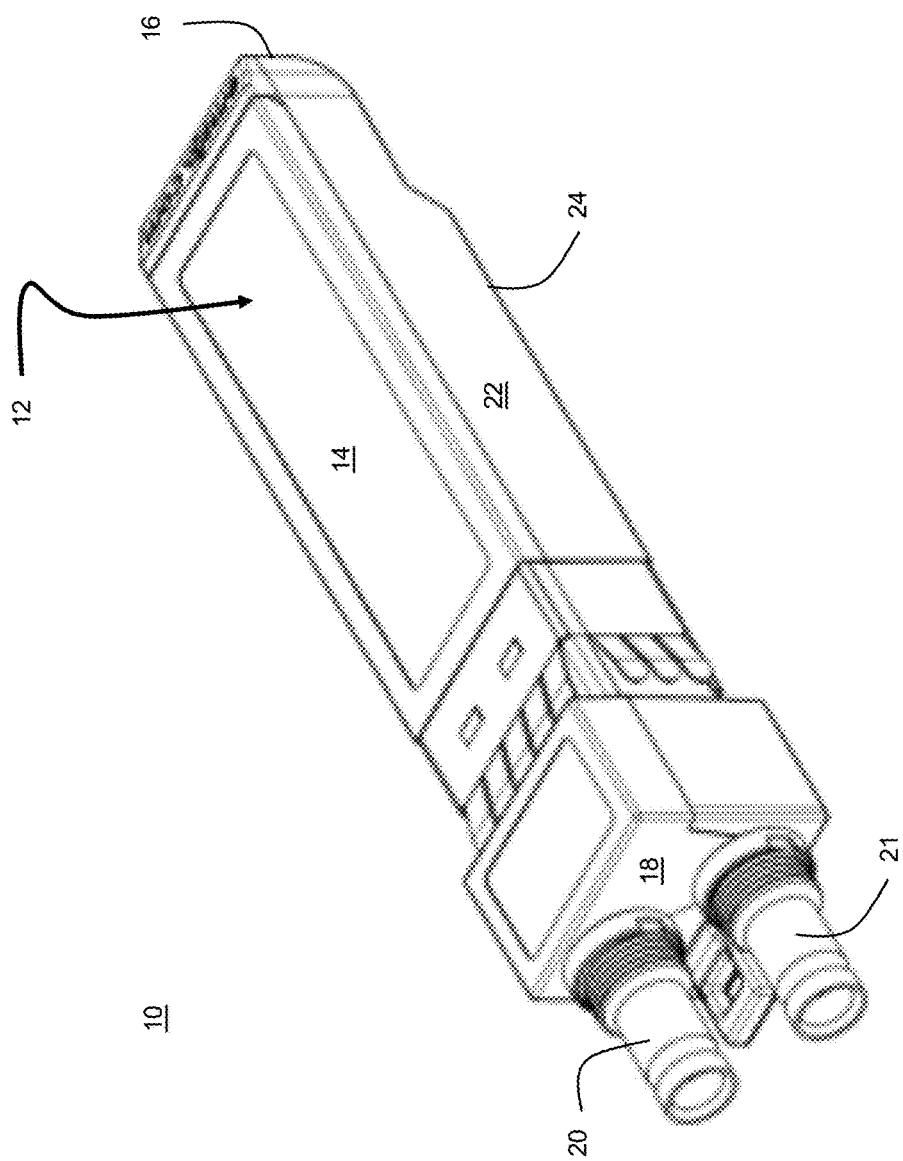
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. While conventional units merely provide connection capabilities between a hosting unit in which they are inserted and external apparatuses, the standardized hot-pluggable transceiving units disclosed herein also implement specific video flow processing capabilities. These specific video flow processing capabilities provide for reliable transmission of video flows over an Internet Protocol (IP) networking infrastructure and optimized video flow switching. Although the present disclosure is particularly aimed at video IP flows, the teachings of the present disclosure also apply to IP flows transporting other types of payloads than video.

The following terminology is used throughout the present disclosure:
SFP: Small Form-factor Pluggable, this term refers to units that are insertable into a chassis of a hosting unit; in the present disclosure, an SFP unit complies with an industry standard specification.
Connector: A device component for physically joining circuits carrying electrical, optical, radio-frequency, or like signals.

Video signal: Analog or digital signal usable for display purposes, either directly on a monitor, or through any transport medium (for example multicast or broadcast).

SDI: Serial Digital Interface, a family of digital video interfaces using one or more coaxial cables with Bayonet Neill-Concelman (BNC) connectors.

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

The SFP unit comprises a housing having a front panel, a back panel, a top, a bottom and two sides. The front panel includes at least one connector for connecting a cable, a fiber, twisted pairs, etc. The back panel includes at least one connector for connecting to a hosting unit. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP unit may correspond to SFP, SFP+, XFP, Xenpak, QSFP, QSFP+, CFP, CPAK, or any other known standards related to Small Form-factor Pluggable units.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 comprises a rear connector 17, for instance an electrical or an optical connector. In an example, the back panel comprises the rear connector 17 (also named a host connector) suitable to connect the SFP unit 10 to a backplane of a chassis (not shown for clarity purposes) of a hosting unit, as known to those skilled in the art.

The SFP unit 10 further comprises a front panel 18 affixed to the housing 12. The front panel 18 comprises one or more connectors, for example a connector 20 of a co-axial cable type such as SDI, adapted to send and/or receive a digital video signal and a connector 21, also of the co-axial cable type, adapted to send and/or receive a digital data signal. The SFP unit 10 further comprises an engagement mechanism, such as for example a latch 26 as shown in a resting position on the bottom 24 in FIG. 2, for maintaining the SFP unit 10 in place within a chassis.

Figure 7:
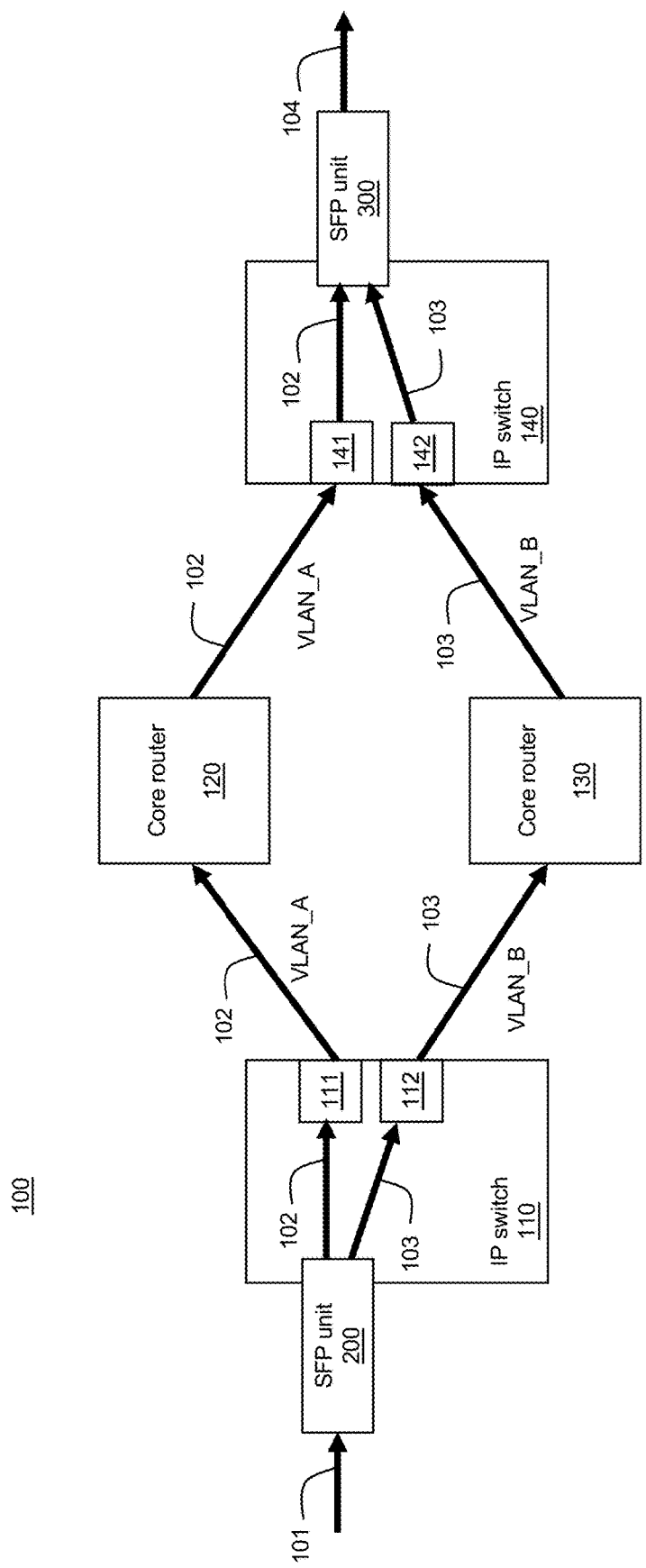
FIG. 7 represents an IP networking infrastructure upon which optimized flow switching is performed.
Figure 8:
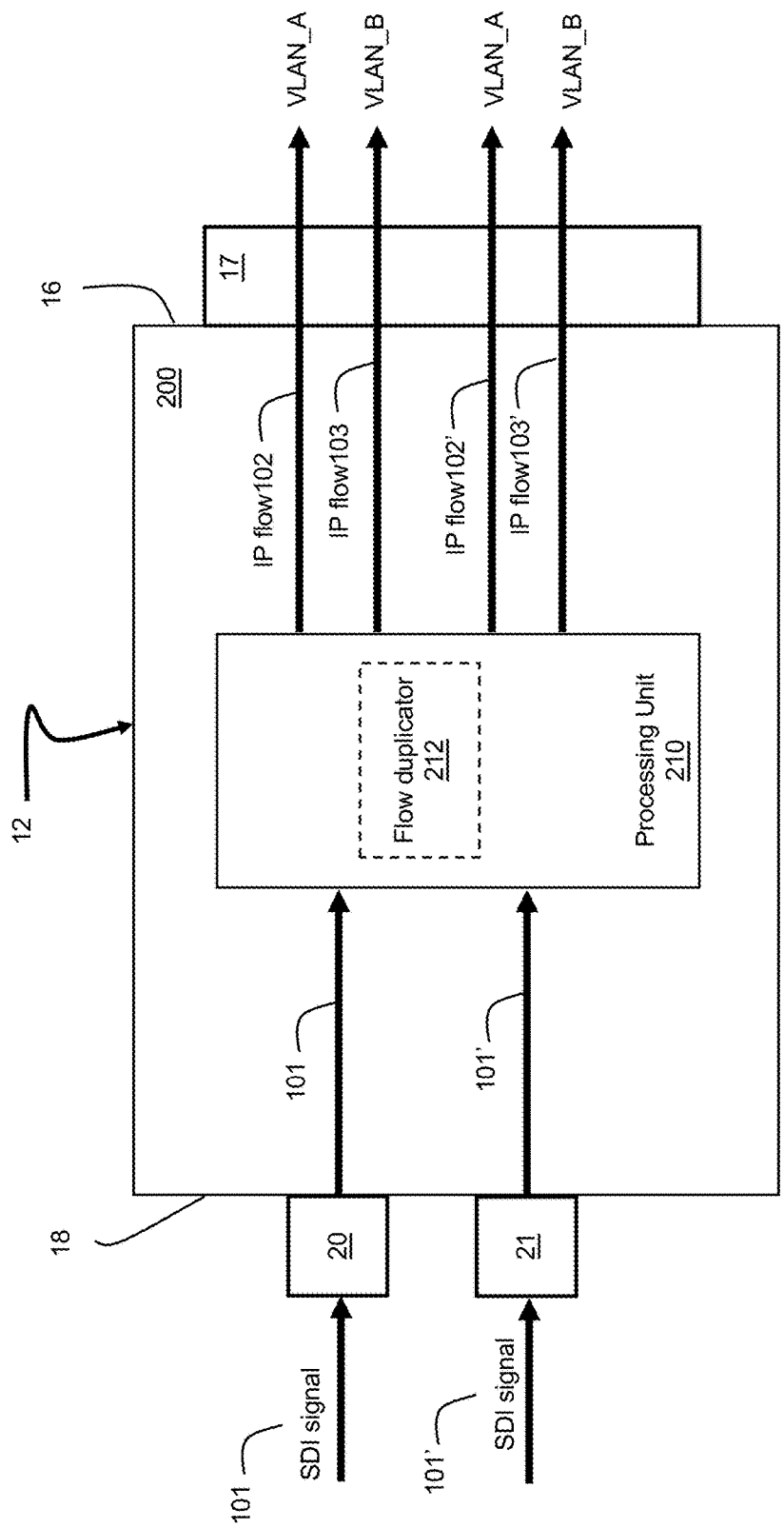
FIG. 8 represents a simplified exemplary block diagram of a source SFP unit illustrated in FIG. 7.
Figure 9:
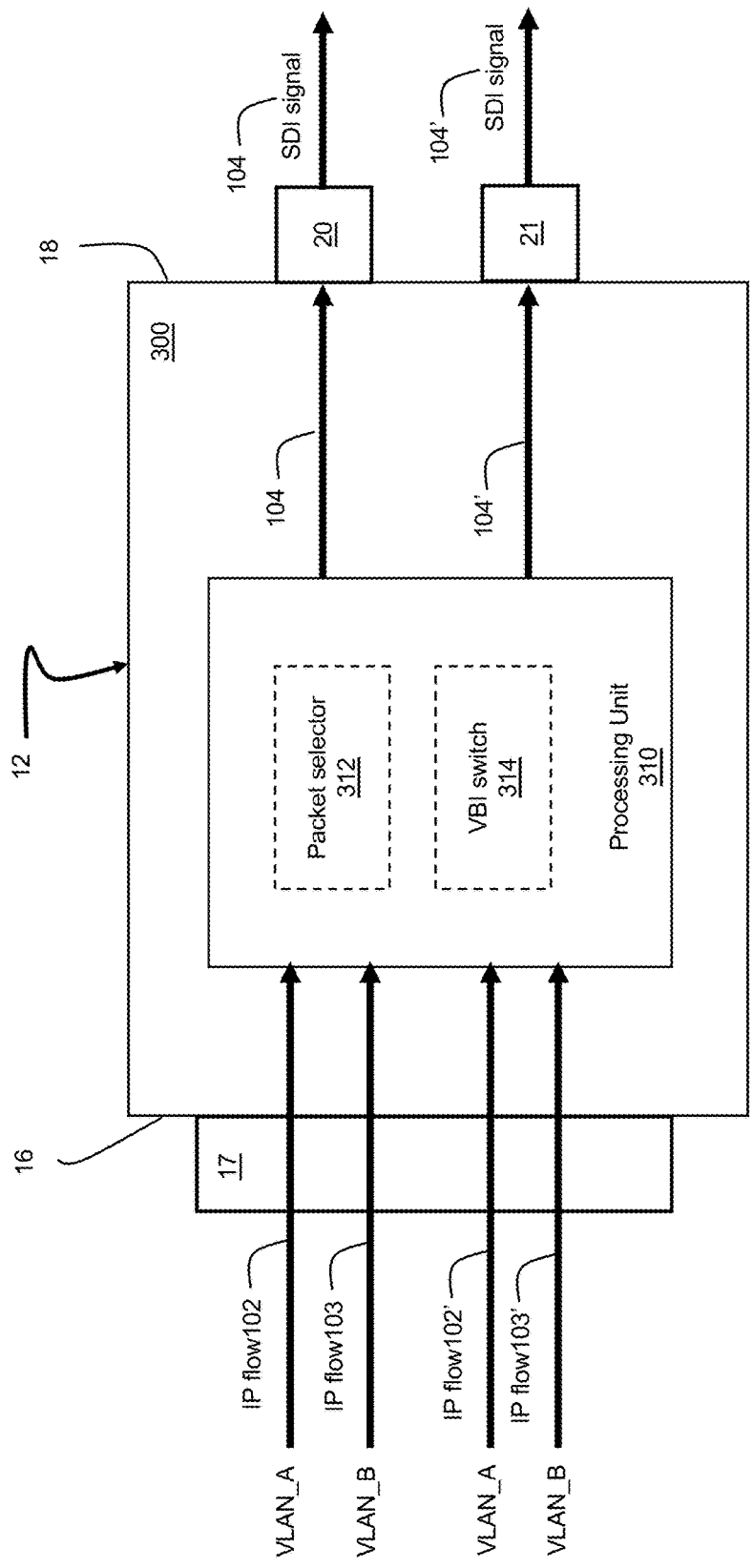
FIG. 9 represents a simplified exemplary block diagram of a destination SFP unit illustrated in FIG. 7.

Reference is now made concurrently to FIGS. 7, 8 and 9. In FIG. 7, an IP networking infrastructure 100 is represented. The IP networking infrastructure 100 comprises a source IP switch 110, two core routers 120 and 130, and a destination IP switch 140.

The IP switch 110 has one or more interfaces adapted for receiving an SFP unit. An SFP unit 200 adapted for being inserted into a chassis of the IP switch 110 is represented in FIGS. 7 and 8. The SFP unit 200 corresponds to the SFP unit 10 represented in FIGS. 1 to 6, and comprises the housing 12, the back panel 16 and the front panel 18.

The SFP unit 200 receives an SDI signal 101 from a video source not represented in the Figures for simplification purposes. Examples of video sources include professional video recorders for the film industry, security cameras, television broadcasting equipment, etc. The SDI signal 101 is received via a front connector 20 of the SFP unit 200. The SDI signal 101 is converted into two corresponding IP flows 102 and 103 by a processing unit 210 of the SFP unit 200.

The conversion of an SDI signal 101 into a corresponding IP flow 102 is well known in the art. The payload originally transported by the SDI signal 101 from the video source to the SFP unit 200, is further transported by the IP flow 102 from the SFP unit 200 to the destination IP switch 140 via the source IP switch 110. For example, the SDI signal 101 comprises a video payload, and may also comprise an audio payload and/or a metadata payload (e.g. closed caption text, subtitle text, rating text, a time code (e.g. for indicating a time interval before a program goes live), a Vertical Blanking Interval (VBI), V-chip rating, etc.). The corresponding IP flow 102 transports the video payload (and optionally the audio payload and/or the metadata payload) of the original SDI video signal 101. The SDI signal 101 may also comprise solely an audio payload or a metadata payload, and the corresponding IP flow 102 also transports solely the audio payload or the metadata payload.

The processing unit 201 of the SFP unit 200 comprises a flow duplicator functionality 212 for generating the two corresponding IP flows 101 and 102, based on the SDI signal 101. Each one of the IP flows 101 and 102 transports the payload of the original SDI signal 101. By transporting the same payload, IP flows 101 and 102 provide a redundancy in the transport of the payload over the IP networking infrastructure 100 between the source IP switch 110 and the destination IP switch 140, as will be further illustrated later in the description.

Other types of video signals (e.g. High-Definition Multimedia Interface (HDMI) video signals, etc.) can be received by the SFP unit 200, and converted into corresponding video IP flows 102 and 103. For example, instead of being an SDI connector adapted for receiving the SDI signal 101, the front connector 20 of the SFP unit 200 is an HDMI connector adapted for receiving an HDMI video signal.

Furthermore, although video signals and video payloads are used in the present disclosure for illustration purposes, other types of signals 101 transporting other types of payloads can be received by the SFP unit 200, and converted into corresponding IP flows 102 and 103 for transporting the other type of payload. The front connector 20 of the SFP unit 200 is adapted for receiving the particular type of signal 101.

The IP flows 102 and 103 generated by the processing unit 210 of the SFP unit 200 are outputted to the IP switch 110 via the rear connector 17 of the SFP unit 200. The IP flows 102 and 103 are processed by the IP switch 110 (in a manner well known in the art of IP switching), and outputted via respective ports 111 and 112 of the IP switch 110. The IP flows 102 and 103 are further transported via two different IP paths of the IP networking infrastructure 100. As illustrated in FIG. 7, IP flow 102 is transported from source IP switch 110 to destination IP switch 140 through a first IP path comprising core router 120. IP flow 103 is transported from source IP switch 110 to destination IP switch 140 through a second IP path comprising core router 130.

The transport of IP flows over an IP networking infrastructure though IP switches and routers is well known in the art. An IP flow consists in a sequence of IP packets from a source (e.g. source SFP unit 200) to a destination (e.g. destination SFP unit 300), delivered via zero, one or more intermediate routing or switching equipment (e.g. IP switches 110 and 140, core routers 120 and 130). Several protocol layers are involved in the transport of the IP packets of the IP flow, including a physical layer (e.g. optical or electrical), a link layer (e.g. Media Access Control (MAC)), an Internet layer (e.g. IPv4 or IPv6), a transport layer (e.g. User Datagram Protocol (UDP)), and one or more application layers ultimately embedding a payload, such as a video payload. The IP flow provides end-to-end delivery of the applicative payload (e.g. video) over an IP networking infrastructure 100 such as the one represented in FIG. 7. The IP flow may be unicast or multicast. Furthermore, by using two duplicate IP flows 102 and 103 for transporting the same applicative payload, the resilience of the delivery of the applicative payload is improved. For example, even if the IP path used for transporting IP flow 102 is temporarily unavailable (e.g. core router 120 is no longer operational) or prone to errors/delays, IP flow 103 still provides a reliable alternative for the transport of the applicative payload.

The IP networking infrastructure 100 represented in FIG. 7 is for illustration purposes only. For example, additional routers or switches may be present in the IP paths used for transporting IP flows 102 and 103 between source IP switch 110 and destination IP switch 140. Additionally, the IP switches 110 and/or 140 may be replaced by edge routers, the core routers 120 and/or 130 may implement switching functionalities in addition to their routing capabilities, etc.

The IP flows 102 and 103 are received by the destination IP switch 140 via ports 141 and 142. The IP flows 102 and 103 are processed by the IP switch 140 (in a manner well known in the art of IP switching), and transmitted to the destination SFP unit 300 via its rear connector 17.

A processing unit 310 of the SFP unit 300 implements a packet selector functionality 312 for selecting IP packets from one of the simultaneously received first (102) and second (103) IP flows. The processing unit 310 generates an SDI signal 104 based on the selected IP packets. The conversion of IP packets of an IP flow (102 or 103) into a corresponding SDI signal 104 is well known in the art. The SDI signal 104 transports the payload of the selected IP packets, which is the original payload of source SDI signal 101.

The SDI signal 104 is outputted via a front connector 20 of the SFP unit 300 to a destination not represented in the Figures for simplification purposes. Examples of destinations include a video screen with an SDI interface, an SDI based video broadcasting equipment, etc.

As mentioned previously, other types of video signals (e.g. HDMI) can be received by the SFP unit 200, and converted into the corresponding video IP flows 102 and 103. In this case, the processing unit 310 of the SFP unit 300 generates a corresponding type of video signal 104 (e.g. HDMI). The front connector 20 of the SFP unit 300 is adapted for outputting the corresponding type of video signal 104 (e.g. HDMI front connector).

Furthermore, as mentioned previously, other types of signals 101 transporting other types of payloads (than video) can be received by the SFP unit 200, and converted into corresponding IP flows 102 and 103 for transporting the other type of payload. In this case, the processing unit 310 of the SFP unit 300 generates a signal 104 corresponding to the source signal 101. The front connector 20 of the SFP unit 300 is adapted for outputting the corresponding type of signal 104.

The type of source signal 101 received by the SFP unit 200 may also be different from the type of destination signal 104 outputted by the SFP unit 300. However, both signals 101 and 104 need to be adapted for transporting the same type of payload, such as video. For example, the source signal 101 is an SDI video signal and the destination signal 104 is a HDMI video signal. In this case, the video payload transported by IP flows 102 and 103 originates from an SDI signal, and needs to be adapted by the SFP unit 300 for being outputted in the form of the HDMI video signal 104.

The packet selector functionality 312 of the SFP unit 300 operates based on one or more criteria for selecting IP packets from one of the simultaneously received first (102) and second (103) IP flows. Such criteria include one or more of the following: packet loss, packet latency, packet jitter, corrupted payload, etc. A policy for selecting the IP packets based on a set of criteria is pre-configured in the SFP unit 300, and enforced by the packet selector functionality 312. Alternatively or complementarily, the policy is received (and can be updated) via a configuration command received by the SFP unit 300. For instance, the SFP unit 300 implements a web server functionality allowing remote configuration of the policy. The policy may include defining a main IP flow (e.g. 102) from which the IP packets are selected by default, and a secondary IP flow (e.g. 103) from which the IP packets are selected only if the main IP flow does not meet the criteria. If none of IP flows 102 and 103 meet the criteria for selecting their respective IP packets, an error message can be generated and transmitted to an entity responsible for managing the transport of the payload via IP flows 102 and 103.

In the case where the IP flows 102 and 103 are multicast IP flows, the source SFP unit 200 is configured to generate the two different multicast IP flows 102 and 103 upon reception of the SDI signal 101. The source SFP unit 200 generates the first multicast IP flow 102 having a first specific multicast IP address (e.g. 224.2.132.70) corresponding to a first specific multicast group. The source SFP unit 200 generates the second multicast IP flow 103 having a second specific multicast address (e.g. 224.2.132.71) corresponding to a second specific multicast group. The multicast IP flows 102 and 103 are delivered to the destination SFP unit 300 via a multicast infrastructure implemented by networking equipment (e.g. 110, 120, 130 and 140) of the IP networking infrastructure 100, as is well known in the art. The destination SFP unit 300 is configured to join the first specific multicast group (e.g. 224.2.132.70) for receiving the first multicast IP flow 102, and is configured to join the second specific multicast group (e.g. 224.2.132.71) for receiving the second multicast IP flow 103. For example, the Internet Group Management Protocol (IGMP) is used by SFP unit 300 for respectively joining the multicast IP flows 102 and 103. As mentioned previously, configuration commands received respectively by the SFP units 200 and 300 can be used for configuring the characteristics of the multicast IP flows 102 and 103.

The IP flows 102 and 103 may also be unicast IP flows, with configuration commands being received respectively by the SFP units 200 and 300 for configuring the characteristics of the unicast IP flows 102 and 103. SFP units 200 and 300 use a dedicated control protocol (e.g. the Session Initiation Protocol (SIP)) for initiating the transmission of unicast IP flows 102 and 103 from SFP unit 200 to SFP unit 300.

Virtual Local Area Networks (VLANs) can be used within the source IP switch 110 to determine which of IP flow 102 or 103 (generated by SFP unit 200) is outputted by which of ports 111 and 112 of the IP switch 110, as is well known in the art. For instance, a first VLAN (VLAN_A) is established for outputting IP flow 102 via port 111 of source IP switch 110, so that IP flow 102 is transported via a first IP path including core router 120. A second VLAN (VLAN_B) is established for outputting IP flow 103 via port 112 of source IP switch 110, so that IP flow 103 is transported via a second IP path including core router 130. The source SFP unit 200 marks the IP packets of IP flow 102 with the tag VLAN_A, and the IP packets of the IP flow 103 with the tag VLAN_B. The VLAN tags (VLAN_A and VLAN_B) are removed when the IP packets leave ports 111 and 112 of IP switch 110. At the destination IP switch 140, the IP flow 102 received via port 141 (connected to core router 120) is tagged with VLAN_A, while the IP flow 103 received via port 142 (connected to core router 130) is tagged with VLAN_B. The exemplary VLANs (VLAN_A and VLAN_B) are represented in FIGS. 7, 8 and 9, to illustrate which IP flow is transported by which VLAN.

Although FIG. 7 represents SFP unit 200 receiving a single SDI signal 101, FIGS. 8 and 9 represent SFP unit 200 receiving a second SDI signal 101'. The SFP unit 200 receives SDI signal 101' from a video source (not represented in the Figures for simplification purposes) via a second front connector 21 of the SFP unit 200. The SDI signal 101' is converted into two corresponding IP flows 102' and 103' by the processing unit 210 of the SFP unit 200, in a manner similar to the conversion of the SDI signal 101 into the two corresponding IP flows 102 and 103. In particular, the flow duplicator functionality 212 of SFP unit 200 is used for generating the two duplicate IP flows 101' and 102' both transporting the payload of the original SDI signal 101'.

The IP flows 102' and 103' generated by the processing unit 210 of the SFP unit 200 are outputted to the IP switch 110 via the rear connector 17 of the SFP unit 200. The IP flows 102' and 103' are processed by the IP switch, and outputted via respective ports 111 and 112 of the IP switch 110. The IP flows 102' and 103' are further transported via the two different IP paths of the IP networking infrastructure 100. Although not represented in FIG. 7 for simplification purposes, IP flow 102' is transported from source IP switch 110 to destination IP switch 140 through the first IP path comprising core router 120, and IP flow 103' is transported from source IP switch 110 to destination IP switch 140 through the second IP path comprising core router 130.

The IP flows 102' and 103' are received by the destination IP switch 140 via ports 141 and 142. The IP flows 102' and 103' are processed by the IP switch 140, and transmitted to the destination SFP unit 300 via its rear connector 17.

The packet selector functionality 312 of SFP unit 300 selects IP packets from one of the simultaneously received first (102') and second (103') IP flows, and generates an SDI signal 104' based on the selected IP packets. The SDI signal 104' transports the payload of the selected IP packets, which is the original payload of source SDI signal 101'. The SDI signal 104' is outputted via a second front connector 21 of the SFP unit 300 to a destination not represented in the Figures for simplification purposes. The packet selector functionality 312 of the SFP unit 300 operates on IP flows 102' and 103' in a manner similar to how it operates on IP flows 102 and 103.

In the case where the IP flows 102' and 103' are multicast IP flows, the source SFP unit 200 is configured to generate a first multicast IP flow 102' having a first specific multicast IP address (e.g. 224.2.132.80) corresponding to a first specific multicast group. The source SFP unit 200 is further configured to generate a second multicast IP flow 103' having a second specific multicast address (e.g. 224.2.132.81) corresponding to a second specific multicast group. The destination SFP unit 300 is configured to join the first specific multicast group (e.g. 224.2.132.80) for receiving the first multicast IP flow 102', and is configured to join the second specific multicast group (e.g. 224.2.132.81) for receiving the second multicast IP flow 103'.

If VLANs are used for tagging the IP flows, IP flow 102' is tagged with the same VLAN (e.g. VLAN_A) as IP flow 102 to be transported via the first IP path including core router 120. IP flow 103' is tagged with the same VLAN (e.g. VLAN_B) as IP flow 103 to be transported via the second IP path including core router 130. Thus, IP flow 102' is tagged with the first VLAN identification (e.g. VLAN_A) when generated by source SFP unit 200, and IP flow 103' is tagged with the second VLAN identification (e.g. VLAN_B) when generated by source SFP unit 200.

Figure 10:
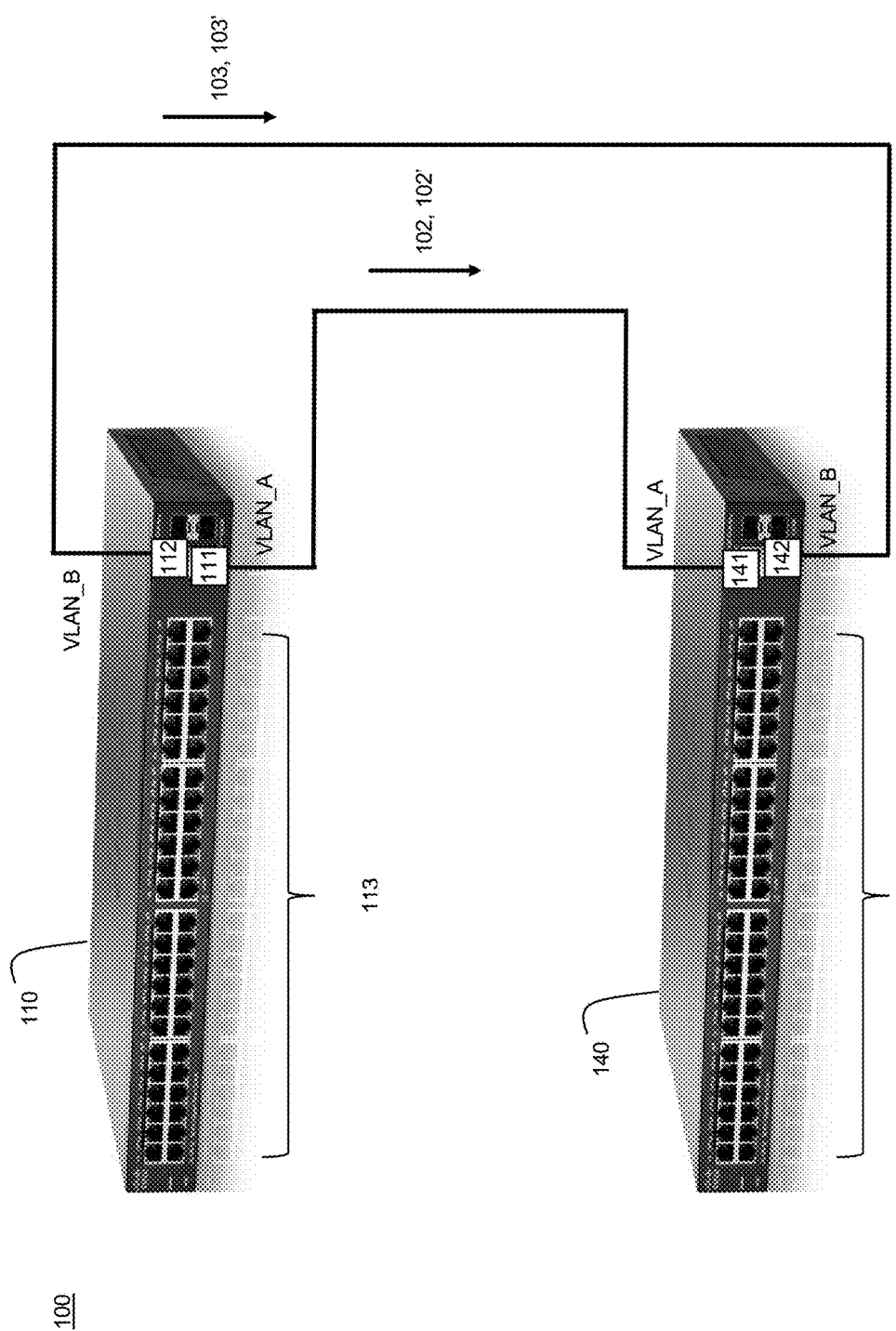
FIG. 10 represents examples of source and destination IP switches illustrated in FIG. 7.

Referring now concurrently to FIGS. 7, 8, 9 and 10, examples of IP switches 110 and 140 represented in FIG. 7 are further detailed in FIG. 10. The source IP switch 110 and the destination IP switch 140 illustrated in FIG. 10 are for illustration purposes.

The source IP switch 110 comprises a plurality of ports 113 adapted for receiving SFP units similar to the SFP unit 200 represented in FIGS. 7 and 8. For example, the source IP switch 110 comprises 48 ports 113 having respectively a bidirectional capacity of 10 Gigabits per second (Gbps). The source IP switch 110 comprises a plurality of aggregation ports for connection to a core IP network. Although not represented in FIG. 10 for simplification purposes, the core IP network includes the core routers 120 and 130 represented in FIG. 7. For example, the source IP switch 110 comprises 4 aggregation ports having respectively a bidirectional capacity of 40 Gbps, including aggregation ports 111 and 112 represented in FIG. 7.

The destination IP switch 140 comprises a plurality of ports 143 adapted for receiving SFP units similar to the SFP unit 300 represented in FIGS. 7 and 9. For example, the destination IP switch 140 comprises 48 ports 143 having respectively a bidirectional capacity of 10 Gbps. The destination IP switch 140 comprises a plurality of aggregation ports for connection to the core IP network. For example, the destination IP switch 140 comprises 4 aggregation ports having respectively a bidirectional capacity of 40 Gbps, including aggregation ports 141 and 142 represented in FIG. 7. This example is for illustration purposes only.

IP packets are exchanged between aggregation port 111 of IP switch 110 and aggregation port 141 of IP switch 140. IP packets are exchanged between aggregation port 112 of IP switch 110 and aggregation port 142 of IP switch 140. As mentioned previously, IP flows 102 and 102' are tagged (inside IP switch 110) with VLAN_A to be outputted by aggregation port 111, and IP flows 103 and 103' are tagged (inside IP switch 110) with VLAN_B to be outputted by aggregation port 112. IP flows 102 and 102' are tagged with VLAN_A when received by aggregation port 141, and IP flows 103 and 103' are tagged with VLAN_B when received by aggregation port 142.

For each port 113 of IP switch 110 having a capacity of 10 Gbps, a source SFP unit 200 can be connected (via its rear connector 17) to port 113. The SFP unit 200 receives (via its front connectors 20 and 21) two 1.5 Gbps High Definition (HD) SDI signals 101 and 101', which are transformed into four 1.5 Gbps IP flows 102, 103, 102' and 103' (outputted via rear connector 17 to port 113). Alternatively, the SFP unit 200 receives (via its front connector 20) a single 3 Gbps HD SDI signal 101, which is transformed into two 3 Gbps IP flows 102 and 103 (outputted via rear connector 17 to port 113).

For each port 143 of IP switch 140 having a capacity of 10 Gbps, a destination SFP unit 300 can be connected (via its rear connector 17) to port 143. The SFP unit 300 receives (via its rear connector 17 from port 143) four 1.5 Gbps IP flows 102, 103, 102' and 103', which are transformed into two 1.5 Gbps HD SDI signals 104 and 104' (outputted via front connectors 20 and 21). Alternatively, the SFP unit 300 receives (via its rear connector 17 from port 143) only two 3 Gbps IP flows 102 and 103, which are transformed into a single 3 Gbps HD SDI signals 104 (outputted via front connector 20).

The 10 Gbps capacity of the ports 113 of IP switch 110 and the ports 143 of IP switch 140 is for illustration purposes only. The ports 113 and 143 may have a greater capacity (e.g. 20 Gbps, 50 Gbps, etc.). The number of SDI signals (e.g. 101 and 101') which can be received by the SFP unit 200 depends on the bandwidth of the SDI signals and the capacity of the ports 113. Similarly, the number of IP flows (e.g. 102, 103, 102' and 103') which can be received by the SFP unit 300 depends on the bandwidth of the IP flows and the capacity of the ports 143.

In a particular configuration, a single IP switch (e.g. 110) is used in place of the two IP switches 110 and 140. In this case, IP switch 110 receives each of SFP units 200 and 300 in one of its ports 113. IP switch 110 further comprises the aggregation ports 141 and 142, in addition to aggregation ports 111 and 112.

Referring now concurrently to FIGS. 9, 11A-F and 12A-D, a method 500 implemented by the destination SFP unit 300 of FIGS. 7 and 9 for performing optimized flow switching is illustrated. The method 500 provides for temporarily interrupting the use of duplicate IP flows upon occurrence of an IP flow switching between a first source and a second source, in order to preserve bandwidth.

In FIGS. 11A to 11F, only source SFP units 200 and 400 and the destination SFP unit 400 are represented. The remainder of the IP networking infrastructure 100 illustrated in FIG. 7 (IP switches 110 and 140, core routers 120 and 130) is not represented for simplification purposes.

Steps 505 to 525 of the method 500 have already been described in details, in relation to FIGS. 7, 8 and 9.

Figure 11A:
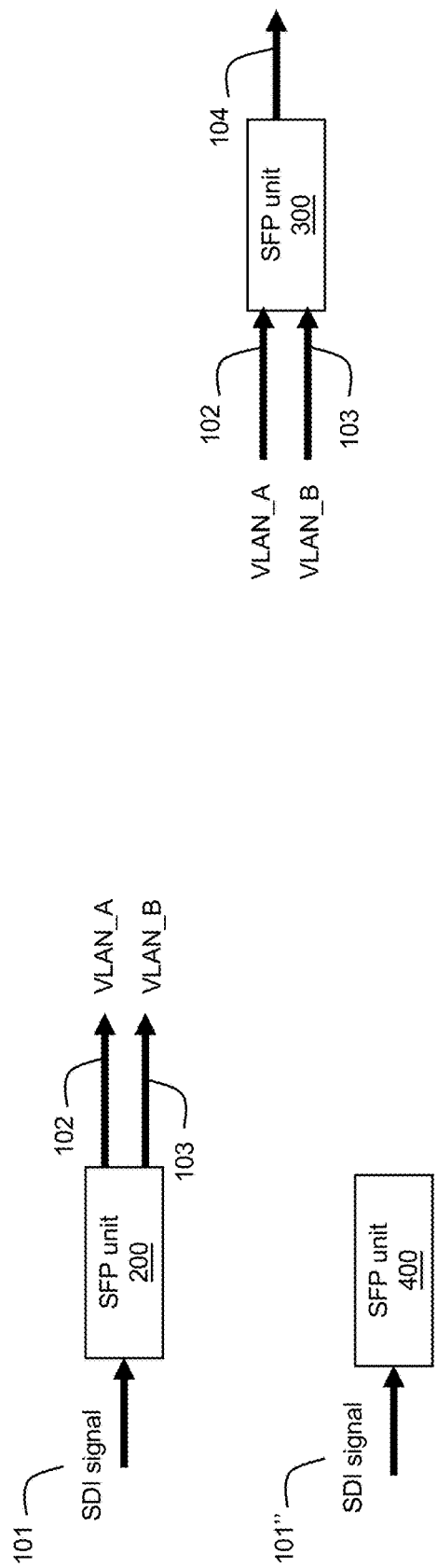
FIGS. 11A-F represent the source and destination SFP units of FIG. 7 at various steps of a method for performing optimized flow switching.

Referring now more particularly to FIGS. 11A and 12A, the source SFP unit 200 illustrated in FIGS. 7 and 8 receives the first source SDI signal 101 and generates the corresponding duplicate IP flows 102 and 103. The destination SFP unit 300 illustrated in FIGS. 7 and 9 receives the duplicate IP flows 102 and 103, and generates the corresponding destination SDI signal 104. As mentioned previously, if VLANs are used for tagging the IP flows, IP flow 102 was tagged with VLAN_A by SFP unit 200 while IP flow 103 was tagged with VLAN_B by SFP unit 200; and SFP unit 300 receives IP flow 102 tagged with VLAN_A and IP flow 103 tagged with VLAN_B.

At step 505 of the method 500, the SFP unit 300 receives the first IP flow 102 transporting a payload corresponding to the first source SDI signal 101.

At step 510 of the method 500, the SFP unit 300 receives the second IP flow 103 also transporting a payload corresponding to the first source SDI signal 101.

Although steps 505 and 510 are represented sequentially on FIG. 12A for simplification purposes, these steps occur concurrently. IP packets from IP flows 102 and 103 are received simultaneously via the rear connector 17 of the SFP unit 300.

At step 515 of the method 500, the processing unit 310 of the SFP unit 300 selects IP packets from one of the simultaneously received first (102) and second (103) IP flows. More specifically, the selection is performed by the packet selector functionality 312 implemented by the processing unit 310.

At step 520 of the method 500, the processing unit 310 of the SFP unit 300 generates, based on the IP packets selected at step 515, the SDI signal 104 comprising a payload corresponding to the first source SDI signal 101.

At step 525 of the method 500, the SDI signal 104 (generated at step 520) comprising a payload corresponding to the first source SDI signal 101 is outputted via the front connector 20 of the SFP unit 300.

Figure 11B:
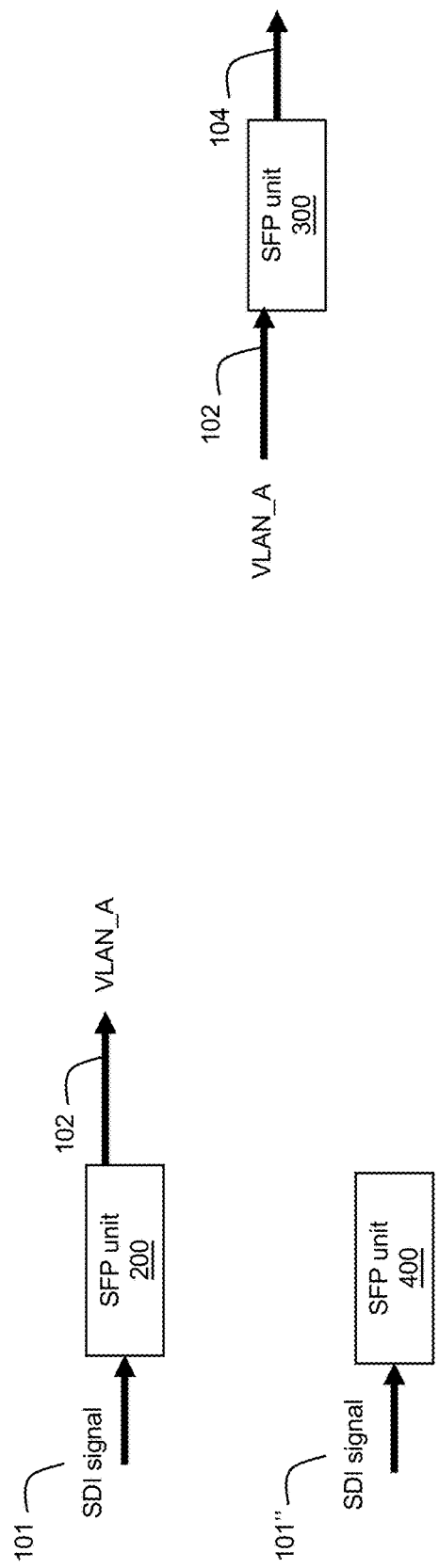
Figure 12B:
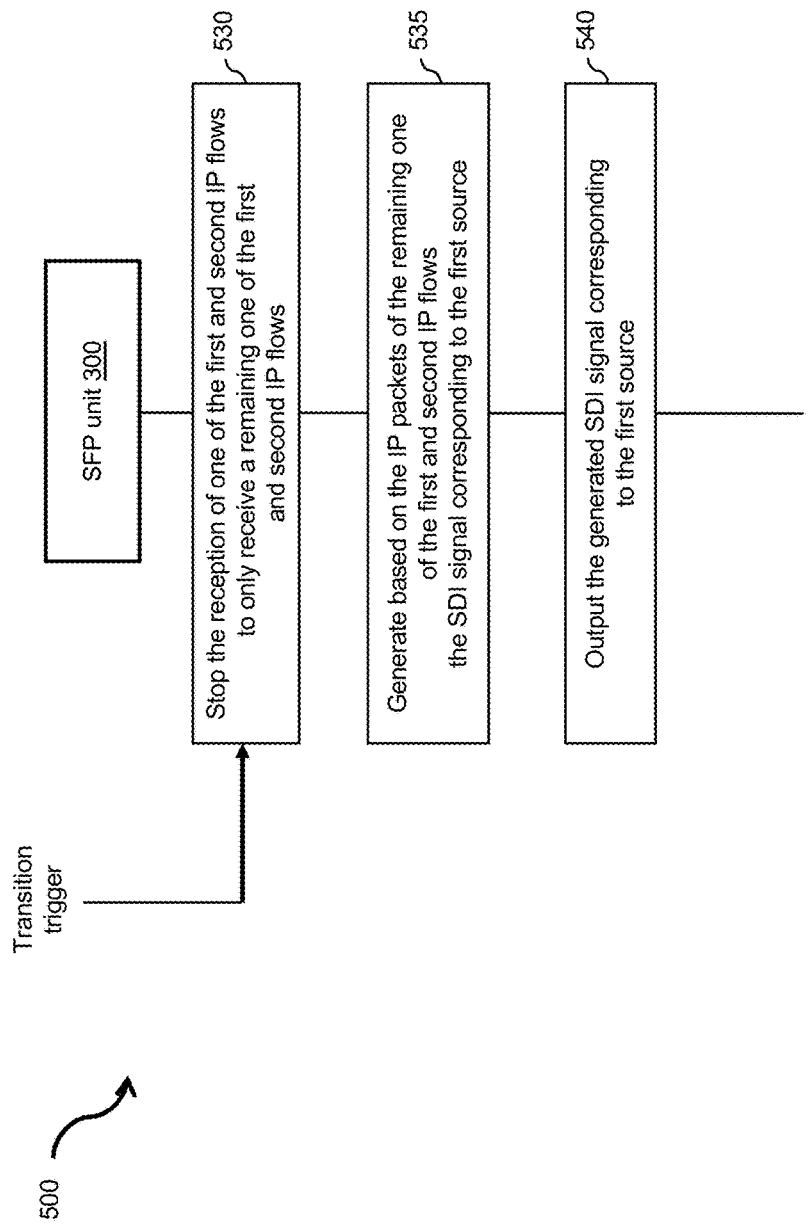

Reference is now made more particularly to FIGS. 11B and 12B.

At step 530 of the method 500, the SFP unit 300 stop the reception of the one of the first (102) and second (103) IP flows, to only receive a remaining one of the first (102) and second (103) IP flows. For instance, as illustrated in FIG. 11B, the SFP unit 300 only receives the first IP flow 102.

Step 530 of the method 500 is triggered by a transition trigger. For instance, the transition trigger consists of a transition command received by SFP unit 300 for performing a transition from source SDI signal 101 to source SDI signal 101". Alternatively, the transition trigger may be determined internally by the SFP unit 300.

The IP flow being stopped at step 530 is the one from which IP packets are not selected at step 515 of the method 500, which is the second IP flow 103 in the example illustrated in FIG. 11B. The reason for this choice is that the IP flow selected at step 515 of the method 500 is the IP flow being transported via the healthiest IP path (e.g. no delay or minimal delay, no packet loss or minimal packet loss, etc.). The probability of having the quality of transmission on the heathiest IP path deteriorate at the exact moment when the transition occurs is considered to be very low, and the impact of such a deterioration of the transmission quality would be unnoticeable.

In an alternative embodiment, the IP flow being stopped at step 530 may be specified in the previously mentioned (at step 530) transition command received by SFP unit 300.

At step 535 of the method 500, the processing unit 310 of the SFP unit 300 generates, based on the IP packets of the remaining one of the first (102) and second (103) IP flows, the SDI signal 104 comprising a payload corresponding to the first source SDI signal 101. As mentioned at step 530, FIG. 11B illustrates the remaining one being the first IP flow 102.

At step 540 of the method 500, the SDI signal 104 (generated at step 535) comprising a payload corresponding to the first source SDI signal 101 is outputted via the front connector 20 of the SFP unit 300.

Figure 11C:
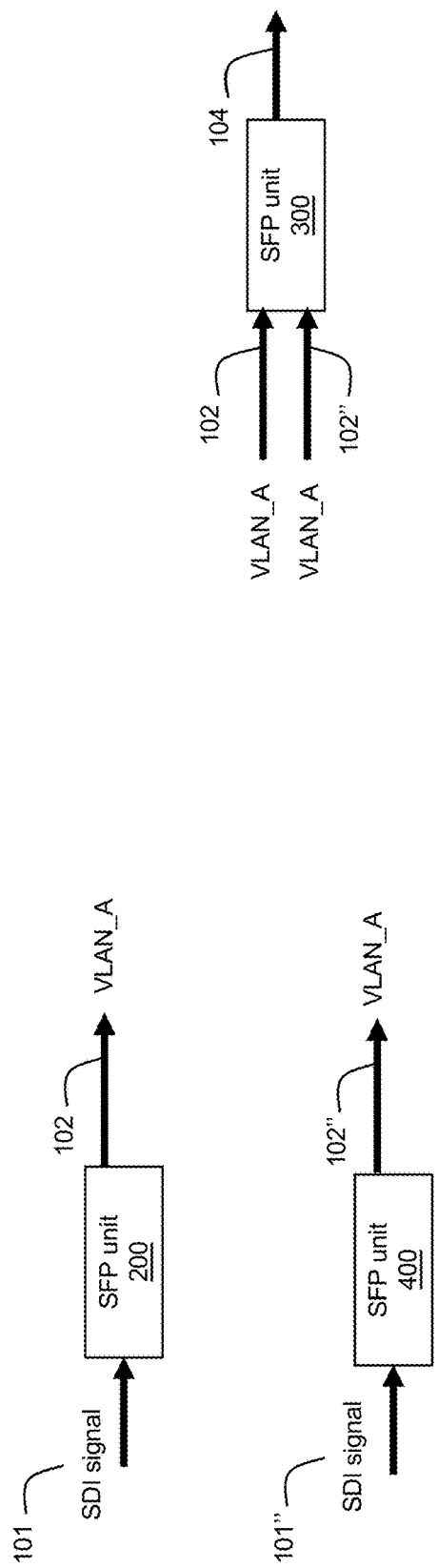
Figure 11D:
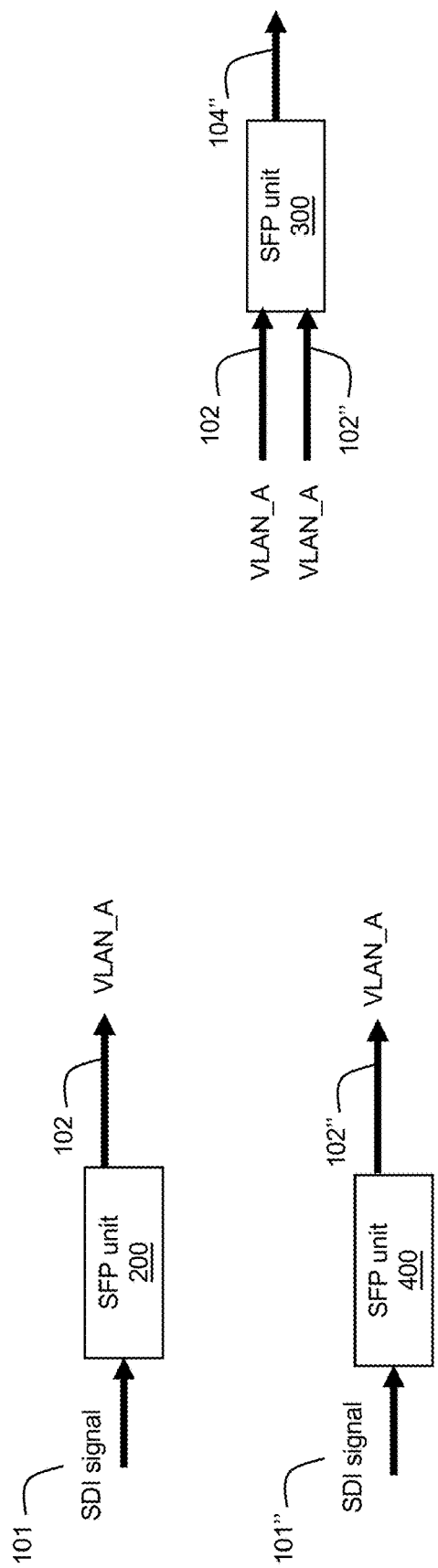
Figure 12C:
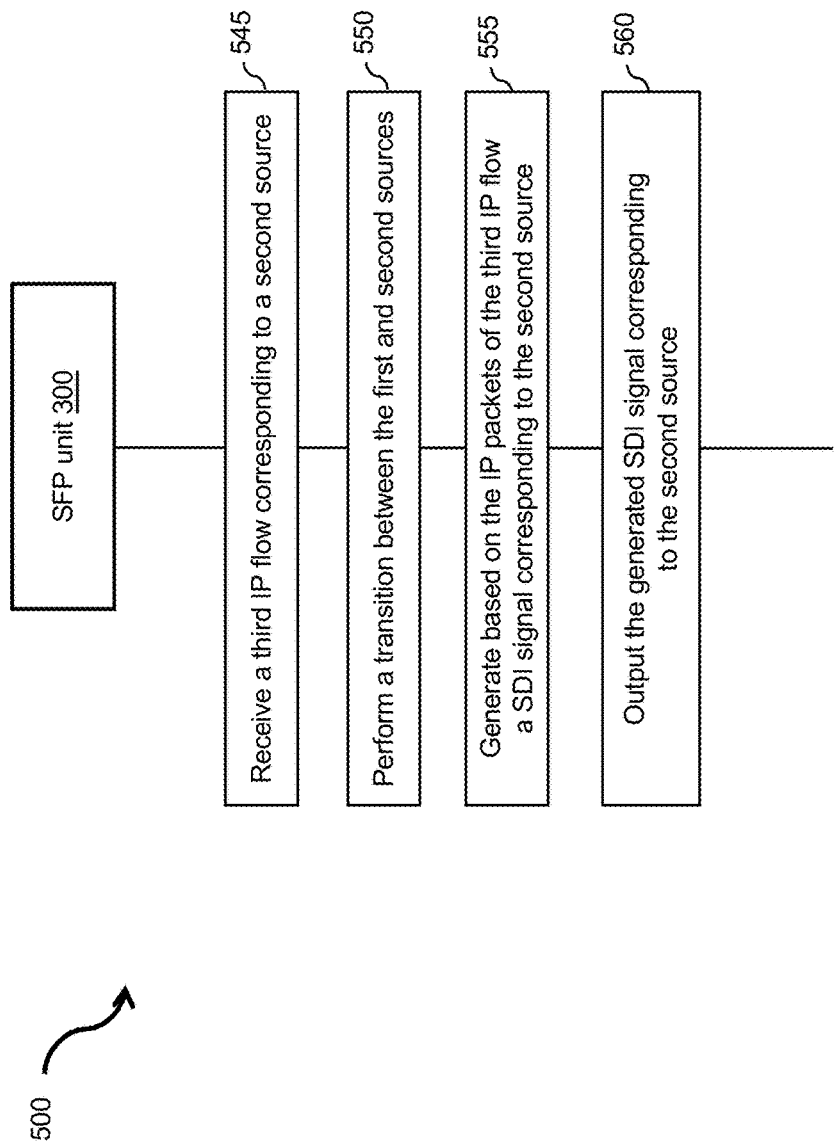

Reference is now made more particularly to FIGS. 11C, 11D and 12C.

A second source SFP unit 400 receives a second source SDI signal 101" and generates a corresponding third IP flow 102". The source SFP unit 400 operates in a manner similar to the source SFP unit 200. The SFP unit 400 is also connected (via a rear connector) to a port 143 of the source switch 110 represented in FIG. 10. Alternatively, the SFP unit 400 is connected to a port of another source switch not represented in the Figures. The third IP flow 102" is transported to the destination switch 140 through the IP networking infrastructure 100 represented in FIGS. 7 and 10 in a manner similar to the transport of the first IP flow 102. The third IP flow 102" is processed by the destination switch 140 and transmitted to the destination SFP unit 300. If VLANs are used for tagging the IP flows, IP flow 102" is tagged with the same VLAN as the remaining one of the first (102) and second (103) IP flows mentioned at step 530. For example, as illustrated in FIGS. 11C and 11D, the remaining one mentioned at step 530 is IP flow 102 tagged with VLAN_A. Thus, IP flow 102" is also tagged with VLAN_A.

In a particular embodiment, SFP unit 200 and 400 are the same. The first source SDI signal 101 and the second source SDI signal 101" are both received by the same SFP unit 200, via respectively front connectors 20 and 21 of SFP unit 200.

At step 545 of the method 500, the SFP unit 300 receives the third IP flow 102" transporting a payload corresponding to the second source SDI signal 101".

At step 550 of the method 500, the processing unit 310 of the SFP unit 300 performs a transition between the first source (corresponding to SDI signal 101) and the second source (corresponding to SDI signal 101"). In the case of a video payload, the transition consists in a smooth frame transition between a frame corresponding to the first source SDI signal 101 and a frame corresponding to the second source SDI signal 101". More specifically, the frame transition is performed by the Video Blank Interval (VBI) switch functionality 314 implemented by the processing unit 310. VBI switching between two sources of video is a mechanism well known in the art, which consists in waiting for the next vertical interval, on a specific designated switching line, to switch from the first source to the second source. Before the frame transition, IP packets from IP flow 102 are used for generating frames (transported by SDI signal 104 represented in FIG. 11C) corresponding to the first source SDI signal 101. After the frame transition, IP packets from IP flow 102" are used for generating frames (transported by SDI signal 104" represented in FIG. 11D) corresponding to the second source SDI signal 101". During the transition, a transition SDI signal (not represented in FIG. 11C) may be generated by the SFP unit 300 based on one or more last frames corresponding to the first source SDI signal 101 and on one or more first frames corresponding to the second source SDI signal 101". The transition SDI signal is outputted by the front connector of the SFP unit 300. When the transition is completed, IP packets from IP flow 102 are no longer used, as illustrated at step 555.

At step 555 of the method 500, the processing unit 310 of the SFP unit 300 generates, based on the IP packets of the third IP flow 102", the SDI signal 104" comprising a payload corresponding to the second source SDI signal 101".

At step 560 of the method 500, the SDI signal 104" (generated at step 555) comprising a payload corresponding to the second source SDI signal 101" is outputted via the front connector 20 of the SFP unit 300.

Figure 11E:
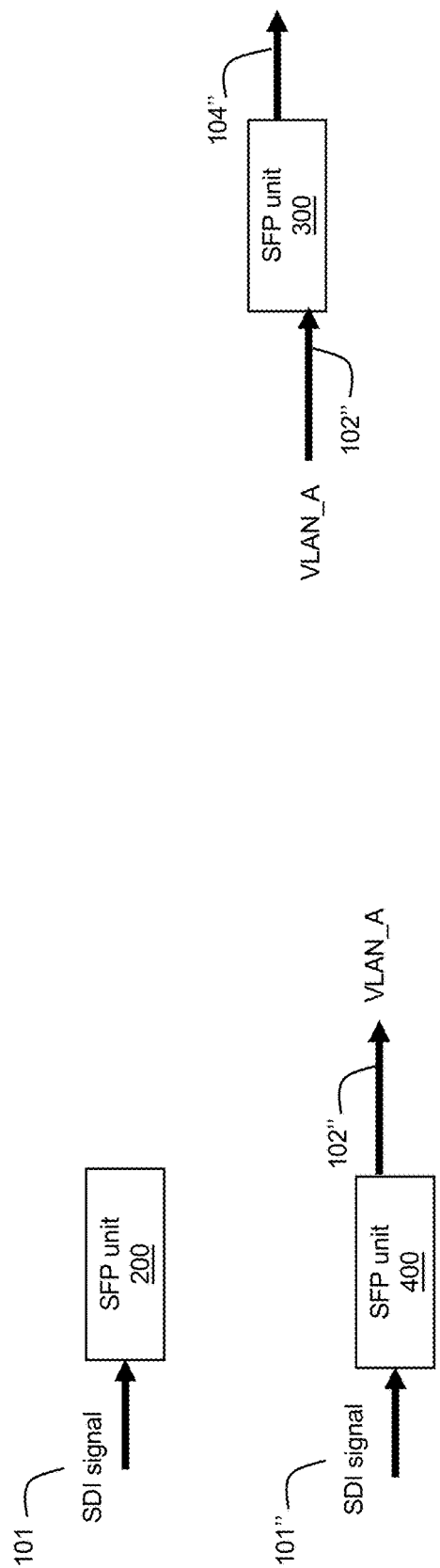
Figure 11F:
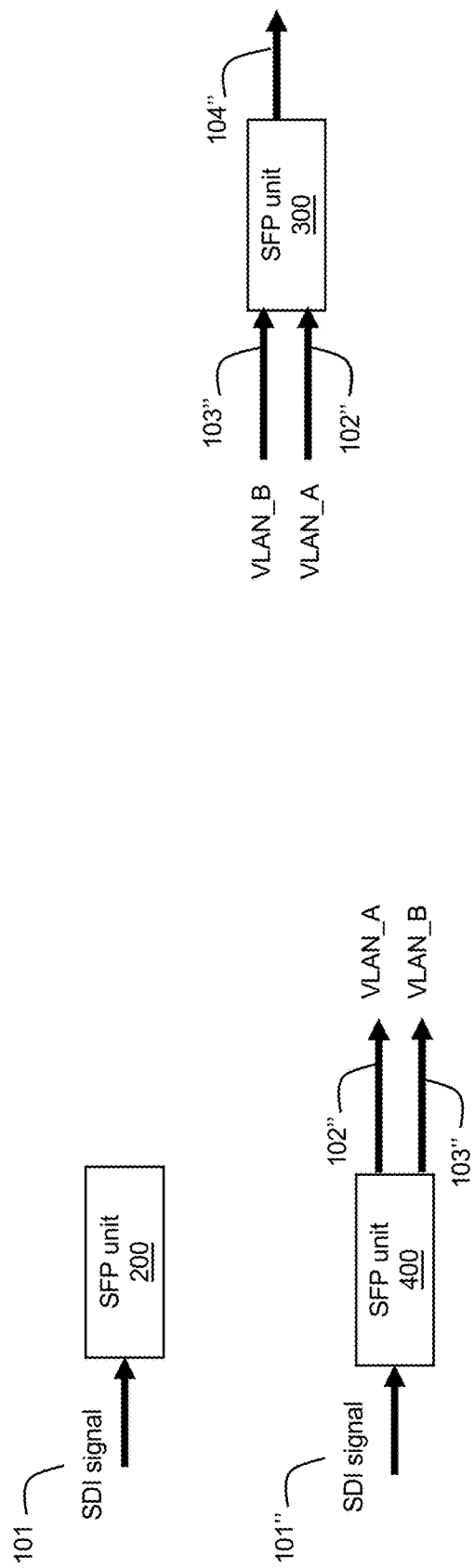
Figure 12D:
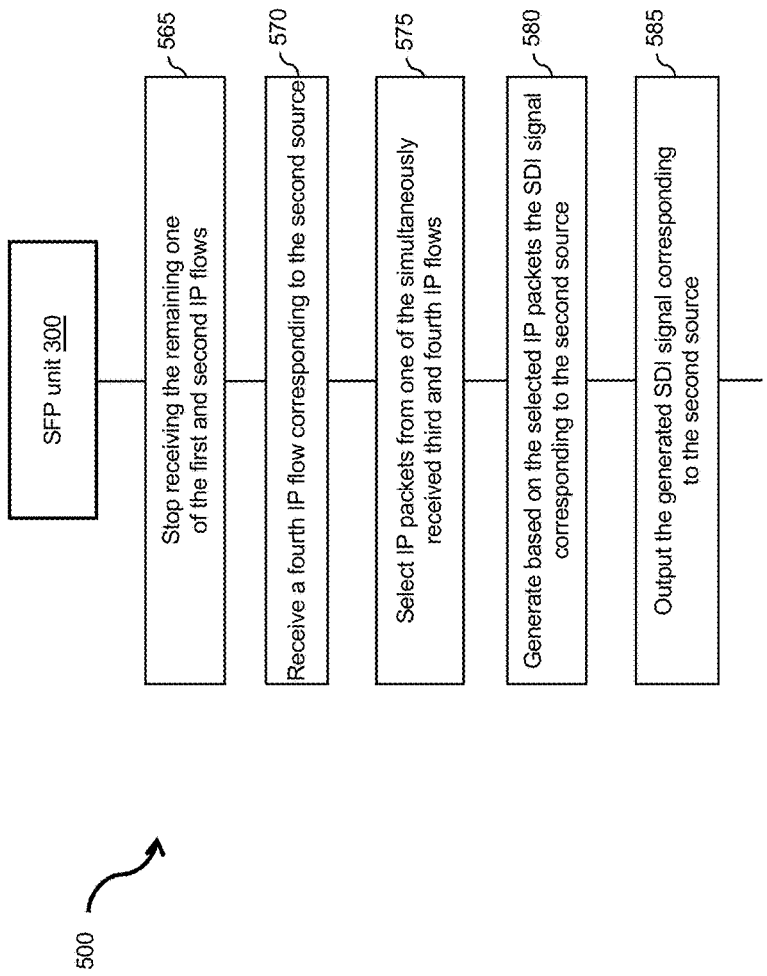

Reference is now made more particularly to FIGS. 11E, 11F and 12D.

At step 565 of the method 500, the SFP unit 300 stops the reception of the remaining one of the first (102) and second (103) IP flows transporting a payload corresponding to the first source SDI signal 101. In the example illustrated in FIG. 11B, the SFP unit 300 had stopped receiving the second IP flow 103 from SFP unit 200. Thus, as illustrated in FIG. 11E, the SFP unit 300 now also stops receiving the first IP flow 102 from SFP unit 200.

At step 570 of the method 500, the SFP unit 300 receives a fourth IP flow 103" also transporting a payload corresponding to the second source SDI signal 101". This step is illustrated in FIG. 11F. At this point of the method 500, IP packets from the IP flows 102" and 103" are received simultaneously via the rear connector 17 of the SFP unit 300. IP flows 102" and 103" are duplicate IP flows transporting the same payload (corresponding to source SDI signal 101") in the same manner that IP flows 102 and 103 are duplicate IP flows transporting the same payload (corresponding to source SDI signal 101). If VLANs are used for tagging the IP flows, IP flow 103" is tagged with the VLAN not used for tagging IP flow 102". For example, as illustrated in FIG. 11E, IP flow 102" was tagged with VLAN_A. Thus, IP flow 103" is tagged with VLAN_B.

At step 575 of the method 500, the processing unit 310 of the SFP unit 300 selects IP packets from one of the simultaneously received third (102") and fourth (103") IP flows. As mentioned previously, the selection is performed by the packet selector functionality 312 implemented by the processing unit 310.

At step 580 of the method 500, the processing unit 310 of the SFP unit 300 generates, based on the IP packets selected at step 575, the SDI signal 104" comprising a payload corresponding to the second source SDI signal 101".

At step 585 of the method 500, the SDI signal 104" (generated at step 580) comprising a payload corresponding to the second source SDI signal 101" is outputted via the front connector 20 of the SFP unit 300.

In the case where the IP flows 102, 103, 102" and 103" are multicast IP flows, stopping and initiating the transmission of one of these multicast IP flows is performed via multicast commands for respectively leaving and joining the targeted multicast IP flows. The multicast commands are generated by SFP unit 300, transmitted from SFP unit 300 to SFP units 200 or 400, and enforced by SFP units 200 and 400. For example, IGMP leave and join commands can be used, as is well known in the art of IP multicast networking.

As mentioned previously, step 530 of the method 500 is triggered by a transition trigger. Upon the transition trigger, the processing unit 310 of SFP unit 300 generates and transmits a multicast leave command for leaving the second multicast IP flow 103. Upon reception of the multicast leave command, SFP unit 200 stops transmitting the second multicast IP flow 103. As mentioned previously, the multicast IP flow being left is the one from which IP packets are not selected at step 515 of the method 500, which is the second multicast IP flow 103 in the example illustrated in FIG. 11B. Then, at step 530 of the method 500, only the remaining multicast IP flow 102 corresponding to the first source SDI signal 101 is received by SFP unit 300.

The multicast IP flow being left (e.g. 103) is the one having the worst transmission conditions as evaluated by the packet selector functionality 312 of SFP unit 300. It is expected that during the short interval of time during which flow switching between the first source and the second source occurs, the transmission conditions of the remaining one (e.g. 102) of the two duplicated IP flows will not deteriorate.

Following step 530 of the method 500, the processing unit 310 of SFP unit 300 generates and transmits a multicast join command for joining the third multicast IP flow 102". Upon reception of the multicast join command, SFP unit 400 starts transmitting the third multicast IP flow 102". Then, at step 545 of the method 500, the third multicast IP flow 102" corresponding to the second source SDI signal 101" is received by SFP unit 300. The previously mentioned (at step 530) transition command received by SFP unit 300 includes the multicast IP addresses of the two multicast IP flows 102" and 103" corresponding to the second source SDI signal 101". If VLANs are used, the transition command also includes the VLANs used for tagging each multicast IP flow 102" (VLAN_A) and 103" (VLAN_B). The processing unit 310 of SFP unit 300 chooses to join the multicast IP flow corresponding to the second source SDI signal 101" (e.g. 102") which is tagged with the same VLAN (e.g. VLAN_A)

as the remaining multicast IP flow corresponding to the first source SDI signal 101 (e.g. 102). The reason for this choice is to use the VLAN (e.g. VLAN_A) which appears to have the best transmission conditions, as determined by the packet selector functionality 312 of SFP unit 300 at step 515 of the method 500.

Following step 550 of the method 500, the processing unit 310 of SFP unit 300 generates and transmits a multicast leave command for leaving the remaining one of the multicast IP flows (102) corresponding to the first source SDI signal 101. Upon reception of the multicast leave command, SFP unit 200 stops transmitting the second multicast IP flow 102. Then, at step 565 of the method 500, the first (102) and second (103) multicast IP flows corresponding to the first source SDI signal 101 are no longer received by SFP unit 300.

Following step 565 of the method 500, the processing unit 310 of SFP unit 300 generates and transmits a multicast join command for joining the fourth multicast IP flow 103". Upon reception of the multicast join command, SFP unit 400 starts transmitting the fourth multicast IP flow 103". Then, at step 570 of the method 500, the fourth multicast IP flow 103" corresponding to the second source SDI signal 101" is received by SFP unit 300.

In the case where the IP flows 102, 103, 102" and 103" are unicast IP flows, stopping and initiating the transmission of one of these unicast IP flows is performed via leave and join commands of a standardized or proprietary control protocol. For example, SIP can be used for initiating or terminating the transmission of the unicast IP flows 102, 103, 102" and 103" when appropriate. The sequence of leave and join commands (e.g. SIP INVITE and BYE messages) is the same as the previously described sequence of multicast leave and join commands.

When performing the method 500, SFP unit 300 processes IP flows 102, 103, 102" and 103" received via its rear connector 17, and generates SDI signals 104 and 104" transmitted via its first front connector 20. Simultaneously, SFP unit 300 can process IP flows 102' and 103' received via its rear connector 17, and generate SDI signal 104' transmitted via its second front connector 21, as detailed previously in the description with reference to FIGS. 8 and 9. Steps 505 to 525 of the method 500 are also performed by SFP unit 300 for the processing of IP flows 102' and 103', and the generation of SDI signal 104'. For example, the source SDI signals 101 and 101" are associated to a first video channel, and the source SDI signal 101' is associated to a second video channel. The SFP unit 300 is capable of processing the two video channels simultaneously. Furthermore, the SFP unit 300 is capable of performing a transition between a current program of the first video channel (source SDI signal 101) and another program of the first video channel (source SDI signal 101').

Figure 13:
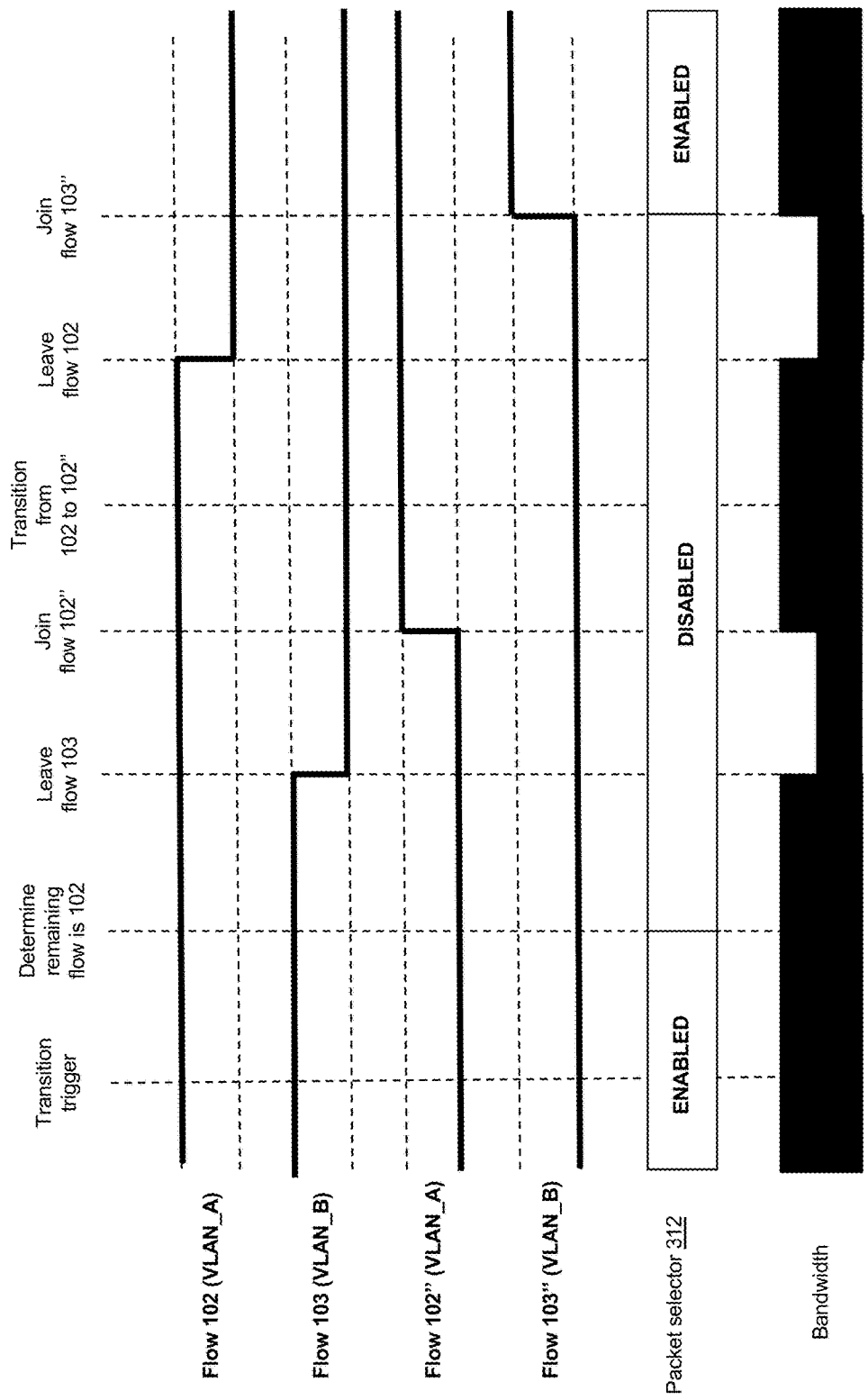
FIG. 13 represents a timing diagram showing the sequence of the method illustrated in FIGS. 12A-D.

The method 500 provides several advantages. A first advantage consists in allowing to switch smoothly (the switch is not noticeable, or barely noticeable) from a payload corresponding to the first source SDI signal 101 to a payload corresponding to the second source SDI signal 101" without consuming an excessive bandwidth (FIG. 13 represents the evolution of the consumed bandwidth before, during, and after the flow switching procedure). As mentioned previously and by comparison, the "Leave Before Join" approach where the last frame of a first video source (e.g. the first source SDI signal 101) is frozen does not provide a transition as smooth as the one provided by the method 500. Regarding the "Join Before Leave" approach, it consumes twice as much bandwidth than the method 500 during the transition phase. A second advantage of the method 500 when it is used in combination with VLANs is to allow a receiving device (e.g. SFP unit 300) having a single connector (e.g. rear connector 17 of FIG. 9) for receiving all the IP flows, to effectively receive duplicate IP flows travelling through two different IP paths. The duplicate IP flows are transported via the two different IP paths identified via two different VLANs. The receiving device (e.g. SFP unit 300) is connected to an IP equipment (e.g. IP switch 140 of FIG. 10) which marks the received IP packets with the VLAN identifying the IP path used for transporting the IP packets.

FIG. 13 represents a timing diagram showing the sequence of the method 500 illustrated in FIGS. 12A-D and 11A-F.

As illustrated in FIG. 9, the SFP unit 300 includes a processing unit 300 for implementing the packet selector functionality 312 and the VBI switch functionality 314. Additionally, the processing unit 300 executes a computer program implementing the steps of the method 500. Although a single processing unit 300 is represented in FIG. 9, a plurality of processing units 300 may be included in the SFP unit 300. The functionalities implemented by the SFP unit 300 are distributed between the several processing units 300.

The method 500 is not limited to being implemented on an SFP unit, but may be implemented on any computing device capable of performing the steps of the method 500. The computing device includes a processing unit, and a non-transitory computer program product (e.g. a permanent memory) for storing instructions deliverable via an electronically-readable media. The electronically-readable media may consist of a storage media (e.g. a USB key storing the instructions) or communication links (e.g. a network connection for receiving the instructions from a remote computing server). The instructions when executed by the processing unit of the computing device implement the method 500.

Referring concurrently to FIGS. 9 and 11A-F, the computing device comprises an first interface adapted for receiving the IP flows 102, 103, 102', 103', 102" and 103" The computing device comprises a second interface adapted for outputting the SDI signals 104 and 104''', and a third interface adapted for outputting the SDI signals 104'.

Additionally, the method 500 is not limited to generating and outputting the SDI signal 104, 104' and 104''', but may generate and output other signals, such as for instance IP flows.

For example, at step 520 of the method 500, the processing unit of the computing device generates based on the selected IP packets an outgoing IP flow transporting a payload corresponding to the first source. The payload of the selected IP packets may receive one (or more) particular treatment by the processing unit of the computing device (e.g. a color correction, etc.) to generate the outgoing IP flow transporting a payload corresponding to the first source. At step 525 of the method 500, the generated outgoing IP flow transporting a payload corresponding to the first source is outputted by the computing device.

At step 535 of the method 500, the processing unit of the computing device generates the outgoing IP flow transporting a payload corresponding to the first source based on the IP packets of the remaining one of the first and second IP flows. As mentioned previously, the payload of the remaining one of the first and second IP flows may receive the one (or more) particular treatment by the processing unit of the computing device to generate the outgoing IP flow transporting a payload corresponding to the first source. At step 540 of the method 500, the generated outgoing IP flow transporting a payload corresponding to the first source is outputted by the computing device.

At step 550 of the method 500, the transition between the first and second sources may simply consist in determining the last IP packet of the remaining one of the first and second IP flows to be used, and the first IP packet of the third IP flow to be used, in order to implement a smooth transition when generating the outgoing IP flow. Alternatively, based on the one (or more) particular treatment applied by the processing unit of the computing device, a particular transition algorithm may also be applied.

At step 555 of the method 500, the processing unit of the computing device generates an outgoing IP flow transporting a payload corresponding to the second source based on the IP packets of the third IP flow. As mentioned previously, the payload of the third IP flow may receive the one (or more) particular treatment by the processing unit of the computing device to generate the outgoing IP flow transporting a payload corresponding to the second source. At step 560 of the method 500, the generated outgoing IP flow transporting a payload corresponding to the second source is outputted by the computing device.

At step 580 of the method 500, the processing unit of the computing device generates based on the selected IP packets an outgoing IP flow transporting a payload corresponding to the second source. As mentioned previously, the payload of the selected IP packets may receive the one (or more) particular treatment by the processing unit of the computing device to generate the outgoing IP flow transporting a payload corresponding to the second source. At step 585 of the method 500, the generated outgoing IP flow transporting a payload corresponding to the second source is outputted by the computing device.

The other steps of the method 500 are performed as previously described.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method implemented by a standardized hot-pluggable transceiving unit for performing optimized flow switching, the method comprising:
   receiving via a rear connector of the transceiving unit a first Internet Protocol (IP) flow transporting a payload corresponding to a first source;
   receiving via the rear connector a second IP flow transporting a payload corresponding to the first source;
   selecting by a processing unit of the transceiving unit IP packets from one of the simultaneously received first and second IP flows, and generating based on the selected IP packets a Serial Digital Interface (SDI) signal comprising a payload corresponding to the first source;
   stopping the reception of one of the first and second IP flows to only receive a remaining one of the first and second IP flows via the rear connector, and generating the SDI signal comprising a payload corresponding to the first source based on the IP packets of the remaining one of the first and second IP flows;
   receiving via the rear connector a third IP flow transporting a payload corresponding to a second source;
   performing by the processing unit a transition between the first source and the second source;
   generating by the processing unit an SDI signal comprising a payload corresponding to the second source based on the IP packets of the third IP flow;
   stopping the reception of the remaining one of the first and second IP flows via the rear connector;
   receiving via the rear connector a fourth IP flow transporting a payload corresponding to the second source; and
   selecting by the processing unit IP packets from one of the simultaneously received third and fourth IP flows, and generating based on the selected IP packets the SDI signal comprising a payload corresponding to the second source;
   wherein the SDI signal comprising a payload corresponding to the first source and the SDI signal comprising a payload corresponding to the second source are outputted via a front connector of the transceiving unit.

2. The method of claim 1, wherein the transceiving unit comprises a housing having specific standardized dimensions and adapted to being inserted into a chassis of a hosting unit, the rear connector is located on a back panel of the housing, and the front connector is located on a front panel of the housing.

3. The method of claim 1, wherein stopping the reception of one of the first and second IP flows to only receive a remaining one of the first and second IP flows via the rear connector consists in stopping the reception of the one of the first and second IP flows from which the IP packets for generating the SDI signal comprising a payload corresponding to the first source are not selected.

4. The method of claim 1, wherein the first, second, third and fourth IP flows consist of multicast IP flows.

5. The method of claim 4, wherein upon a transition trigger, the processing unit transmits a multicast command for leaving the one of the first and second multicast IP flows from which the IP packets for generating the SDI signal comprising a payload corresponding to the first source are not selected.

6. The method of claim 5, wherein upon reception of the remaining one of the first and second IP flows, the processing unit transmits a multicast command for joining the third multicast IP flow.

7. The method of claim 6, wherein upon execution of the transition between the first source and the second source, the processing unit transmits a multicast command for leaving the remaining one of the first and second multicast IP flows, and the processing unit transmits a multicast command for joining the fourth multicast IP flow.

8. The method of claim 1, wherein the first IP flow is tagged with a first Virtual Local Area Network (VLAN), the second IP flow is tagged with a second VLAN, the third IP flow is tagged with one of the first and second VLANs, the fourth IP flow is tagged with the other one of the first and second VLANs, and the third IP flow is tagged with the same VLAN as the remaining one of the first and second IP flows.

9. The method of claim 1, further comprising:
   receiving via the rear connector a fifth IP flow transporting a payload corresponding to a third source and a sixth IP flow transporting a payload corresponding to the third source;
   selecting by the processing unit IP packets from one of the simultaneously received fifth and sixth IP flows, and generating based on the selected IP packets an SDI signal comprising a payload corresponding to the third source; and outputting the SDI signal comprising a payload corresponding to the third source via a second front connector of the transceiving unit.

10. The method of claim 9, wherein the first and second sources are associated to a first video channel and the third source is associated to a second video channel.

11. A non-transitory computer program product comprising instructions deliverable via an electronically-readable media such as storage media and communication links, the instructions when executed by a processing unit of a computing device providing for performing optimized flow switching by:
receiving a first IP flow transporting a payload corresponding to a first source;
receiving a second IP flow transporting a payload corresponding to the first source;
selecting IP packets from one of the simultaneously received first and second IP flows, and generating based on the selected IP packets an SDI signal comprising a payload corresponding to the first source;
stopping the reception of one of the first and second IP flows to only receive a remaining one of the first and second IP flows, and generating the SDI signal comprising a payload corresponding to the first source based on the IP packets of the remaining one of the first and second IP flows;
receiving a third IP flow transporting a payload corresponding to a second source;
performing a transition between the first source and the second source;
generating an SDI signal comprising a payload corresponding to the second source based on the IP packets of the third IP flow;
stopping the reception of the remaining one of the first and second IP flows;
receiving a fourth IP flow transporting a payload corresponding to the second source; and
selecting IP packets from one of the simultaneously received third and fourth IP flows, and generating based on the selected IP packets the SDI signal comprising a payload corresponding to the second source;
wherein the SDI signal comprising a payload corresponding to the first source and the SDI signal comprising a payload corresponding to the second source are outputted from the computing device.

12. The computer program product of claim 11, wherein the computing device is a hot-pluggable transceiving unit comprising a housing having specific standardized dimensions, the transceiving unit is adapted to being inserted into a chassis of a hosting unit, a rear connector located on a back panel of the housing receives the first, second, third and fourth IP flows, and a front connector located on a front panel of the housing outputs the generated SDI signal.

13. The computer program product of claim 11, wherein stopping the reception of one of the first and second IP flows to only receive a remaining one of the first and second IP flows consists in stopping the reception of the one of the first and second IP flows from which the IP packets for generating the SDI signal comprising a payload corresponding to the first source are not selected.

14. The computer program product of claim 11, wherein the first, second, third and fourth IP flows consist of multicast IP flows.

15. The computer program product of claim 14, wherein upon a transition trigger, the processing unit transmits a multicast command for leaving the one of the first and second multicast IP flows from which the IP packets for generating the SDI signal comprising a payload corresponding to the first source are not selected.

16. The computer program product of claim 15, wherein upon reception of the remaining one of the first and second IP flows, the processing unit transmits a multicast command for joining the third multicast IP flow.

17. The computer program product of claim 16, wherein upon execution of the transition between the first source and the second source, the processing unit transmits a multicast command for leaving the remaining one of the first and second multicast IP flows, and the processing unit transmits a multicast command for joining the fourth multicast IP flow.

18. The computer program product of claim 11, wherein the first IP flow is tagged with a first Virtual Local Area Network (VLAN), the second IP flow is tagged with a second VLAN, the third IP flow is tagged with one of the first and second VLANs, the fourth IP flow is tagged with the other one of the first and second VLANs, and the third IP flow is tagged with the same VLAN as the remaining one of the first and second IP flows.

19. The computer program product of claim 11, wherein:
the processing unit receives a fifth IP flow transporting a payload corresponding to a third source and a sixth IP flow transporting a payload corresponding to the third source;
the processing unit selects IP packets from one of the simultaneously received fifth and sixth IP flows, and generates based on the selected IP packets an SDI signal comprising a payload corresponding to the third source; and
the processing unit outputs the SDI signal comprising a payload corresponding to the third source from the computing device.

20. A method implemented by a standardized hot-pluggable transceiving unit for performing optimized flow switching, the method comprising:
receiving via a rear connector of the transceiving unit a first Internet Protocol (IP) flow transporting a payload corresponding to a first source;
receiving via the rear connector a second IP flow transporting a payload corresponding to the first source;
selecting by a processing unit of the transceiving unit IP packets from one of the simultaneously received first and second IP flows, and generating based on the selected IP packets a High-Definition Multimedia Interface (HDMI) signal comprising a payload corresponding to the first source;
stopping the reception of one of the first and second IP flows to only receive a remaining one of the first and second IP flows via the rear connector, and generating the HDMI signal comprising a payload corresponding to the first source based on the IP packets of the remaining one of the first and second IP flows;
receiving via the rear connector a third IP flow transporting a payload corresponding to a second source;
performing by the processing unit a transition between the first source and the second source;
generating by the processing unit an HDMI signal comprising a payload corresponding to the second source based on the IP packets of the third IP flow;
stopping the reception of the remaining one of the first and second IP flows via the rear connector;
receiving via the rear connector a fourth IP flow transporting a payload corresponding to the second source; and
selecting by the processing unit IP packets from one of the simultaneously received third and fourth IP flows, and generating based on the selected IP packets the HDMI signal comprising a payload corresponding to the second source;

wherein the HDMI signal comprising a payload corresponding to the first source and the HDMI signal comprising a payload corresponding to the second source are outputted via a front connector of the transceiving unit.

\* \* \* \* \*

UNITED STATES PATENT AND TRADEMARK OFFICE
CERTIFICATE OF CORRECTION

PATENT NO. : 10,164,879 B2
APPLICATION NO. : 15/348154
DATED : December 25, 2018
INVENTOR(S) : Yanik Reid et al.

Page 1 of 1

It is certified that error appears in the above-identified patent and that said Letters Patent is hereby corrected as shown below:

On the Title Page

Item (72) correct list of inventorship as shown below:
Yanik REID
Normand LECLERC
Louis CARON
Renaud LAVOIE
Eric DUDEMAINE
Daniel TREMBLAY
Joel MARTEL Signed and Sealed this
Twenty-third Day of June, 2020

Andrei Iancu
*Director of the United States Patent and Trademark Office*